United States Patent
Fukaya et al.

(10) Patent No.: US 9,171,225 B2
(45) Date of Patent: Oct. 27, 2015

(54) DEVICE, METHOD, AND RECORDING MEDIUM FOR DETECTING AND REMOVING MISTRACKED POINTS IN VISUAL ODOMETRY SYSTEMS

(71) Applicant: KABUSHIKI KAISHA TOPCON, Itabashi-ku, Tokyo (JP)

(72) Inventors: Nobuyuki Fukaya, Tokyo (JP); Tetsuji Anai, Tokyo (JP); Nobuo Kochi, Tokyo (JP); Hitoshi Otani, Tokyo (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 0 days.

(21) Appl. No.: 13/791,144

(22) Filed: Mar. 8, 2013

(65) Prior Publication Data

US 2013/0236107 A1    Sep. 12, 2013

(30) Foreign Application Priority Data

Mar. 9, 2012   (JP) .................................. 2012-053450

(51) Int. Cl.
*G06K 9/46* (2006.01)
*G06T 7/00* (2006.01)
*G06T 7/20* (2006.01)

(52) U.S. Cl.
CPC ............... *G06K 9/46* (2013.01); *G06T 7/0042* (2013.01); *G06T 7/2033* (2013.01); *G06T 2207/10012* (2013.01); *G06T 2207/10016* (2013.01); *G06T 2207/10028* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| 8,761,439 | B1* | 6/2014 | Kumar et al. ................. 382/103 |
| 2007/0167154 | A1 | 7/2007 | Ohtomo et al. |
| 2011/0096957 | A1 | 4/2011 | Anai et al. |
| 2012/0053831 | A1* | 3/2012 | Halder .......................... 701/439 |

FOREIGN PATENT DOCUMENTS

| JP | 2006-250917 A | 9/2006 |
| JP | 2007-171048 A | 7/2007 |

(Continued)

OTHER PUBLICATIONS

Nistér, David, Oleg Naroditsky, and James Bergen. "Visual odometry for ground vehicle applications." Journal of Field Robotics 23.1 (2006): 3-20.*

(Continued)

*Primary Examiner* — Chan Park
*Assistant Examiner* — Geoffrey E Summers
(74) *Attorney, Agent, or Firm* — Brinks Gilson & Lione

(57) ABSTRACT

Three-dimensional coordinates of feature points of an object to be measured are back-projected to a frame image photographed from a specific position, and image coordinates of the back-projected feature points and the feature points in this frame image are compared. In this case, the feature points, which are mismatched, are removed as feature points which are mistracked between plural frames. In this case, two processing systems, of which initial conditions of calculation for obtaining the back-projected coordinates are different from each other, are performed, and the detection of the above mistracked points is performed on each of the two back-projected coordinates. The mistracked points detected in at least one of the processing systems are removed, and are not succeeded to the following processing.

4 Claims, 13 Drawing Sheets

(56) References Cited

FOREIGN PATENT DOCUMENTS

JP      2007278844 A   *   10/2007
JP      2010-014443 A      1/2010

OTHER PUBLICATIONS

Nourani-Vatani, Navid, Jonathan Roberts, and Mandyam V. Srinivasan. "Practical visual odometry for car-like vehicles." Robotics and Automation, 2009. ICRA'09. IEEE International Conference on. IEEE, 2009.*

Fraundorfer, Friedrich, and Davide Scaramuzza. "Visual odometry: Part II: Matching, robustness, optimization, and applications." Robotics & Automation Magazine, IEEE 19.2 (2012): 78-90.*

Wei, Lijun, et al. "GPS and stereovision-based visual odometry: application to urban scene mapping and intelligent vehicle localization." International Journal of Vehicular Technology 2011.*

Williamson v. Citrix Online, LLC, No. 2013-1130 (Fed. Cir. Nov. 5, 2014).*

Yokochi, Yuji et al., "Estimation of Extrinsic Camera Parameters Based on Feature Tracking and GPS Data," Information Processing Society of Japan, Mar. 2006, pp. 69-79 (with English abstract).

* cited by examiner

DEVICE, METHOD, AND RECORDING MEDIUM FOR DETECTING AND REMOVING MISTRACKED POINTS IN VISUAL ODOMETRY SYSTEMS

RELATED APPLICATIONS

This application claims priority under 35 U.S.C. §119 to Japanese Patent Application No. 2012-053450 filed on Mar. 9, 2012, the entire content of which is hereby incorporated by reference.

BACKGROUND OF THE INVENTION

1. Field of the Invention

The present invention relates to a technique for processing image data of moving images.

2. Description of Related Art

For example, a system, in which position information of a moving object changing every second is dynamically obtained from data of a GPS (Global Positioning System) and the results are obtained, is in practical use. However, in this technique, data from a GPS satellite may not be always obtained with high accuracy. In particular, this problem may occur in movement in urban areas in which high buildings are built, movement in tunnels, movement in mountainous areas and forest areas, and movement in bad weather. Due to this, when position detection accuracy is required on the order of meter or less, in position detecting techniques depending on only the GPS, the accuracy is insufficient. In this case, when data is obtained in environments in which information cannot be obtained from a GPS or accuracy of information from a GPS is deteriorated, a method is necessary in which position information changing every second is obtained in any way with high accuracy. A technique has been known in which detection of position changing every second is performed based on image sequences by using principle of photographic measurement (see Japanese Unexamined Patent Application Publication No. 2007-171048). In this technique, when information from a UPS is interrupted, a position of a camera changing dynamically can be sequentially obtained from analysis of image sequences by calculation.

However, in the method in which a position of a camera or an object to be measured is obtained from image sequences, errors may be generated. That is, in the method in which a position of a camera or an object to be measured is calculated, processing is executed such that matching relationship between feature points of the object to be measured, which are obtained from (n)th frame image, and feature points of the object to be measured, which are obtained from (n+1)th frame image, is calculated, and feature points of the object to be measured is tracked every second in accordance with change in a photographing position. In this processing, errors of track accuracy of the feature points of the object to be measured, which are successive between frame images next to each other on a time axis, are gradually accumulated.

For example, a technique for overcoming this problem has been proposed in Journal of Information Processing Society of Japan Vol. 47, No. SIG 5 (CVIM 13), Hirotsugu Yokoji, pages 69 to 79, Japanese Unexamined Patent Application Publication No. 2006-250917, and Japanese Unexamined Patent Application Publication No. 2010-14443. The invention described in Journal of Information Processing Society of Japan Vol. 47, No. SIG 5 (CVIM 13), Hirotsugu Yokoji, pages 69 to 79, is directed to a method which simultaneously minimizes an error (reprojection error) between coordinates, in which an estimated three-dimensional position is projected on the image, and coordinates detected on the image, and a position error defined by GPS positioned values. The invention described in Japanese Unexamined Patent Application Publication No. 2006-250917 is directed to a method in which camera vector (CV) data showing the position of the camera and three-dimensional rotational position of the object based on video images, and position measured data of a moving object, are synchronized in time by reference time and are compared on the same time axis, and they are complementarily corrected. The invention described in Japanese Unexamined Patent Application Publication No. 2010-14443 is directed to a method in which processing is repeated in which calculated exterior orientation parameters are corrected based on difference between photographing timing of images and obtaining timing of at least one of a photographing position and a photographing attitude provided from an external section, so that errors are reduced.

SUMMARY OF THE INVENTION

The conventional techniques are those for minimizing errors. However, the problem in which calculated errors gradually increase remains, and improvement in this problem is required. In view of these circumstances, it is an object of the present invention to provide a technique which can effectively reduce tracking accuracy deterioration of feature points of an object to be measured, which may be successive between frames, in techniques for processing image sequences.

According to one aspect of the present invention, a moving image processing device includes: a moving image obtaining unit for obtaining a moving image of an object to be measured, which is continuously photographed by a photographing unit moving relatively to the object; a feature point extracting unit for extracting plural feature points from each of plural frame images included in the moving image; a feature point tracking unit for tracking a matching relationship of the plural feature points in the plural frame images; a real space coordinates calculating unit for calculating real space coordinates of the plural feature points of which the matching relationship is determined; a back projected coordinates calculating unit for back-projecting the real space coordinates of the plural feature points to a frame image photographed from a specific position and calculating a first back-projected coordinate and a second back-projected coordinate; and a mistracked feature point detecting unit for detecting a mistracked point, which is mistracked by the feature point tracking unit, based on the first back-projected coordinate and the second back-projected coordinate, wherein the specific position used in calculating the first back-projected coordinate is calculated by a first method based on the real space coordinates of the plural feature points and image coordinates of the plural feature points in the frame image photographed from the specific position, and the specific position used in calculating the second back-projected coordinate is obtained by a method different from the first method or by the first method using a condition of which system is different from a case of the first back-projected coordinate.

The moving image is composed of plural frame images which are continuously obtained one after another on a time axis. The real space coordinates are coordinates of space in which an object to be measured exists, and are described by using three-dimensional coordinates in general. The feature points are points which can be visually discriminated from another portion (roughness, recesses and projections, edges or the like) of an object to be measured and which can be recognized as characteristic portions. For example, a line-shape edged portion can be recognized as a portion having feature points distributed linearly. Plural feature points are obtained, and three-dimensional shape of the object to be measured is shown by distribution of the feature points. When feature points are finely obtained, three-dimensional description of the object to be measured is finely obtained with high accuracy. The mistracked feature points are feature points having an error in determining matching relationship between different frames. For example, in determining matching relationship of feature points (tracking feature points) between a first frame and a second frame, when feature points, which should have matching relationship actually, are not matched and feature points, which should not have matching relationship actually, are matched incorrectly, the feature points matched incorrectly are mistracked points.

In the method different from the first method is a method of which step is different from that of the first method, or a method in which the same data as in the first method is obtained by using a measuring devices or the like which is different from that of the first method. For example, the first method is assumed to include a step 1 and a step 2. In the step 1, three-dimensional coordinates of feature points of an object to be measured are calculated based on frame images of (n−2)th frame and (n−1)th frame. In the step 2, coordinates of position of the photographing unit in (n)th frame is calculated based on the calculated three-dimensional coordinates of the feature points and the frame image of the (n)th frame. In this case, in the method different from the first method, the coordinates of position of photographing unit in the (n)th frame is calculated by a method (for example, another orientation method) different from the above method of the first method, or the coordinates of position of photographing unit in the (n)th frame is obtained by using a GPS.

The condition of which system is different from a case of the first back-projected coordinate is a case in which a different method or a different measuring device is used as an output source of used condition (for example, parameter of initial condition). This feature uses the following example. For example, in a case in which the first method performs the above step 1 and the above step 2, an example (using the condition of first system) is used in which the initial condition used for calculation of the three-dimensional coordinates of feature points of the object to be measured is obtained by using reference points in photographed images, or an example (using the condition of second system) is used in which the initial condition used for calculation of the three-dimensional coordinates of feature points of the object to be measured is obtained based on GPS information. In an ideal case having no error and no uncertainty, conditions of different systems correspond with each other.

In the above aspect of the present invention, mistracked points of feature points between plural frames which are photographed in moving are detected with high accuracy. That is, feature points are incorrectly tracked, and the feature points, of which matching relationship between different frames is determined incorrectly, are detected with high accuracy.

In general, accuracy of calculation of values of real space coordinates of the feature points of the object to be measured (the object to be photographed) is greatly influenced by accuracy of position of the photographing unit (position of camera) and direction (attitude) of the photographing unit (direction (attitude) of camera) which is used for calculation. That is, calculated values of coordinates of the feature points of the object to be measured are greatly influenced by small difference in direction and position of the photographing unit in principle. This influence is not uniformly received by all the feature points, and some feature points may easily receive this influence and other feature points may not easily receive this influence. The degree of this influence is different in position and direction of the photographing unit.

In particular, tracking points (calculated points) of the mistracked feature points are shifted from the actual position thereof, so that the above small difference in direction and position of the photographing unit greatly influences on calculation accuracy. The degree of influence shown in calculation accuracy of the mistracked points also sensitively receives difference in data of position and direction of the photographing unit.

In the above aspect of the present invention, the detection of the mistracked points is performed by using back-projected coordinates obtained by back-projecting the three-dimensional coordinates of the feature points to the frame image photographed from the specific position. The back-projected coordinates are image coordinates of projected points of the feature points, which are back-projected to the frame image, in the frame image. In the above aspect of the present invention, in a process in which the specific position of the photographing unit, which is used when the back-projected coordinates are obtained, is obtained, different methods are used or different conditions used in the same methods are used. As described above, the calculation accuracy of the feature points of the object to be measured is greatly influenced by the above small difference in direction and position of the photographing unit. In the above aspect of the present invention, when the position of the photographing unit is obtained based on the feature points of the object to be measured, different methods are used or different conditions used in the same methods are used, so that the feature points, which are not determined as mistracked points in the one processing, are more reliably determined as mistracked points in the other processing, and failure to detect mistracked points can be inhibited. In other words, detection accuracy of mistracked points is improved in comparison with case which does not use the method of the above aspect of the present invention.

The above aspect of the present invention can be used for techniques for obtaining position information of photographing side which photographs the moving image, and can also be used for techniques for obtaining position information of the object side to be measured. For example, the above aspect of the present invention can be used for techniques in which landscape is photographed from the moving object which is in motion, and three-dimensional data of the landscape is obtained.

According to one desirable embodiment (second aspect) of the present invention in the first aspect, the mistracked feature point detecting unit may detect the mistracked feature point based on difference between the first back-projected coordinate and a position of the feature point in the frame image and difference between the second back-projected coordinate and a position of the feature point in the frame image.

When the feature point in the real space is incorrectly searched (the three-dimensional coordinates thereof is incorrectly calculated), it is highly probable that the position (the position in back projected coordinates) of the feature point in the back-projected condition in which the feature point is back-projected to the actual image (frame image) may be different from the position of the feature point in the actual image. In the second aspect of the present invention, this may be used for detection of mistracked points which uses the back-projected coordinates.

According to another desirable embodiment (third aspect) of the present invention in the first aspect, the mistracked feature point detecting unit may remove a feature point as a mistracked feature point, the feature point satisfying at least one of a case in which difference between the first back-projected coordinate and a position of the feature point in the frame image exceeds a predetermined value and a case in which difference between the second back-projected coordinate and a position of the feature point in the frame image exceeds a predetermined value.

In third aspect of the present invention, both the mistracked points detected when the first back-projected coordinate is used and the mistracked points detected when the second back-projected coordinate is used may be removed (that is, OR condition may be removed). Thus, removal of mistracked points, which are not detected in the one back-projected coordinate and are detected in the other back-projected coordinate, can be performed. In this method, failure to detect mistracked points can be inhibited, and generation of disadvantages, in which mistracked points may not be removed and errors may be gradually increased in the following calculation, can be inhibited.

According to another desirable embodiment (fourth aspect) of the present invention in the first aspect, the specific position, which is not used in calculating the second back-projected coordinate and is used in calculating the first back-projected coordinate, may be output as a position of the photographing unit.

In fourth aspect of the present invention, data of the three-dimensional coordinates of the object to be measured in the one processing may be succeeded one after another. The other processing may be used only for detecting the mistracked feature points efficiently, and the data used therein may not be succeeded to the following cycles. In this feature, the data used in the calculation of the second back-projected coordinate may not be succeeded to the following cycles, and the data is refreshed every repeated cycles. Thus, in the processing of calculation of the second back-projected coordinate, even if errors are generated due to some reasons, the problem in which the errors are gradually accumulated may not occur.

According to another desirable embodiment (fifth aspect) of the present invention in the first aspect, the feature point extracting unit may re-extract a feature point from a region at which the mistracked feature point was detected. When mistracked points are removed, the number of the feature points succeeded to the following processing may be decreased. In the fifth aspect of the present invention, a feature point may be re-extracted from a region at which the mistracked feature point is detected, so that the number of the feature points in the following processing can be secured, and deterioration of calculation accuracy can be inhibited.

According to another desirable embodiment (sixth aspect) of the present invention in the first aspect, the specific position used in calculating the second back-projected coordinate may be obtained by the first method using the condition of which the system is different from the case of the first back-projected coordinate, and the condition of which the system is different may be a condition of at least one of a position and a direction of the photographing unit which are provided as a calculating condition of the first method.

In detecting the mistracked points which uses the back-projected coordinate when the same calculation method is used, the values of the initial condition of the position and the direction of the photographing unit sensitively influence the detection results. In the sixth aspect of the present invention, at least one of the initial values of the position and the direction of the photographing unit, which sensitively influence the detection results, may be used in the different system, so that the tendency, in which the mistracked points are detected by at least one of the back-projected coordinates, may be stronger, and the detection of the mistracked points may be performed with high accuracy.

According to another desirable embodiment (seventh aspect) of the present invention in the first aspect, the first back-projected coordinate and the second back-projected coordinate may be obtained based on different types of moving images. In the seventh aspect of the present invention, different types of moving images may be used, the tendency, in which the mistracked points are detected by at least one of the back-projected coordinates, may be stronger.

According to another desirable embodiment (eighth aspect) of the present invention in the seventh aspect, the different types of moving images may be a combination of a moving image which is a stereo image and a moving image which is not a stereo image, or a combination of a moving image, which is formed by plural frame images, and a three-dimensional point cloud image.

According to another desirable embodiment (ninth aspect) of the present invention in the first aspect, the moving image processing device may further include: a moving speed calculating unit for calculating a relative moving speed of the photographing unit from a coordinate of the feature point in frame images of at least two frames and a photographing speed of the photographing unit; and a position calculating unit for calculating position data of the photographing unit by using the relative moving speed calculated by the moving speed calculating unit, wherein the position calculating unit calculates the specific position used for calculating the second back-projected coordinate obtained by the method different from the first method.

According to another desirable embodiment (tenth aspect) of the present invention in the first aspect, the moving image processing device may further include: a displacement amount calculating unit for calculating a displacement amount of the photographing unit from position data of the photographing unit corresponding to each of images of at least two frames; and a position calculating unit for calculating position data of the photographing unit by using displacement amount of the photographing section calculated by the displacement amount calculating unit, wherein the position calculating unit calculates the specific position used for calculating the second back-projected coordinate obtained by the method different from the first method.

According to another aspect (eleventh aspect) of the present invention, a moving image processing method include: a moving image obtaining step for obtaining a moving image of an object to be measured, which is continuously photographed by a photographing unit moving relatively to the object; a feature point extracting step for extracting plural feature points from each of plural frame images included in the moving image; a feature point tracking step for tracking a matching relationship of the plural feature points in the plural frame images; a real space coordinates calculating step for calculating real space coordinates of the plural feature points of which the matching relationship is determined; a back projected coordinates calculating step for back-projecting the real space coordinates of the plural feature points to a frame image photographed from a specific position and calculating a first back-projected coordinate and a second back-projected coordinate; and a mistracked feature point detecting step for detecting a mistracked point, which is mistracked by the feature point tracking step, based on the first back-projected coordinate and the second back-projected coordinate, wherein the specific position used in calculating the first back-projected coordinate is calculated by a first method based on the real space coordinates of the plural feature points and image coordinates of the plural feature points in the frame image photographed from the specific position, and the specific position used in calculating the second back-projected coordinate is obtained by a method different from the first method or by the first method using a condition of which system is different from a case of calculating the first back-projected coordinate.

According to another aspect (twelfth aspect) of the present invention, a recording medium in which a moving image processing program read and executed by a computer is stored, wherein the program allows the computer to function as: a moving image obtaining device for obtaining a moving image of an object to be measured, which is continuously photographed by a photographing unit moving relatively to the object; a feature point extracting device for extracting plural feature points from each of plural frame images included in the moving image; a feature point tracking device for tracking a matching relationship of the plural feature points in the plural frame images; a real space coordinates calculating device for calculating real space coordinates of the plural feature points of which the matching relationship is determined; a back projected coordinates calculating device for back-projecting the real space coordinates of the plural feature points to a frame image photographed from a specific position and calculating a first back-projected coordinate and a second back-projected coordinate; and a mistracked feature point detecting device for detecting a mistracked point, which is mistracked by the feature point tracking device, based on the first back-projected coordinate and the second back-projected coordinate, wherein the specific position used in calculating the first back-projected coordinate is calculated by a first method based on the real space coordinates of the plural feature points and image coordinates of the plural feature points in the frame image photographed from the specific position, and the specific position used in calculating the second back-projected coordinate is obtained by a method different from the first method or by the first method using a condition of which system is different from a case of the first back-projected coordinate.

According to the present invention, in techniques for processing image sequences, techniques are provided which can effectively reduce tracking accuracy deterioration of feature points of an object to be measured, which may be successive between frames.

DETAILED DESCRIPTION OF THE PREFERRED EMBODIMENTS

1. First Embodiment
Structure

Figure 1:
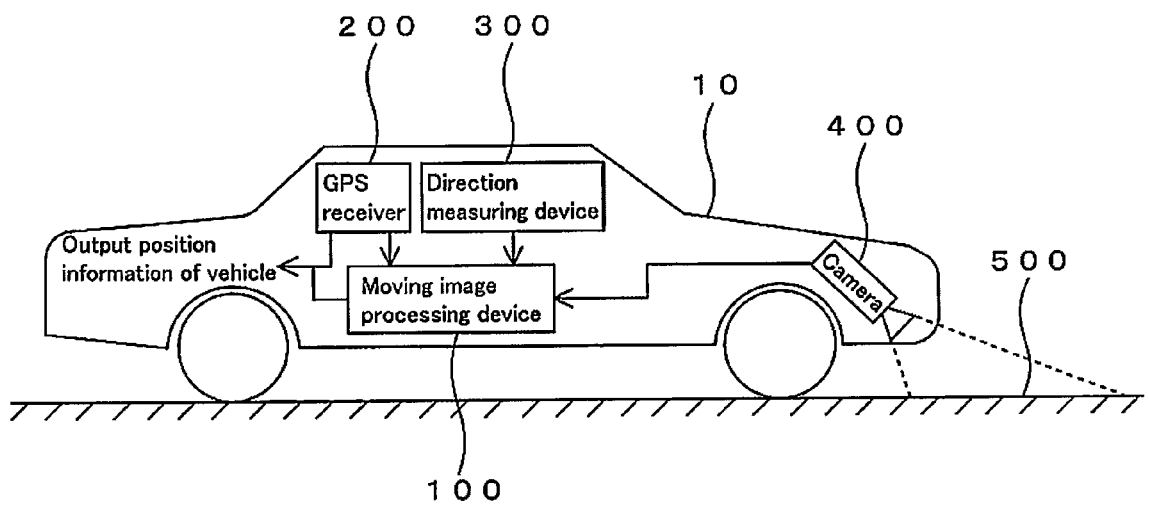
FIG. 1 is a conceptual diagram of an embodiment.

FIG. 1 shows a moving object 10. For example, the moving object 10 is a car (vehicle). In this embodiment, although an example of car is shown as the moving object 10, the moving object 10 is not limited thereto. The moving object 10 is equipped with a moving image processing device 100, a GPS receiver 200, a direction measuring device 300, and a camera 400.

The moving image processing device 100 calculates a position of the moving object 10 in motion, which changes every second, based on image data of moving images of street 500 which is photographed by the camera 400. The GPS receiver 200 is one example of a position obtaining device and obtains position information of the moving object by using a known GPS (Global Positioning System). The direction measuring device 300 measures a direction (attitude) of the camera 400, and has at least one of a direction sensor (an inertial measuring device, a gyroscope, or the like), an acceleration meter, an angular velocity meter, an angular acceleration meter, an angle meter, and the like.

The camera 400 is one example of a photographing unit, and is an image sequence photographing device which continuously photographs frame images at a specific frequency. In this example, the number of the camera 400 is one. The camera 400 is fixed to a frame of the moving object 10, and the direction (optical axis) is fixed with to respect to a body of the moving object 10.

Figure 2:
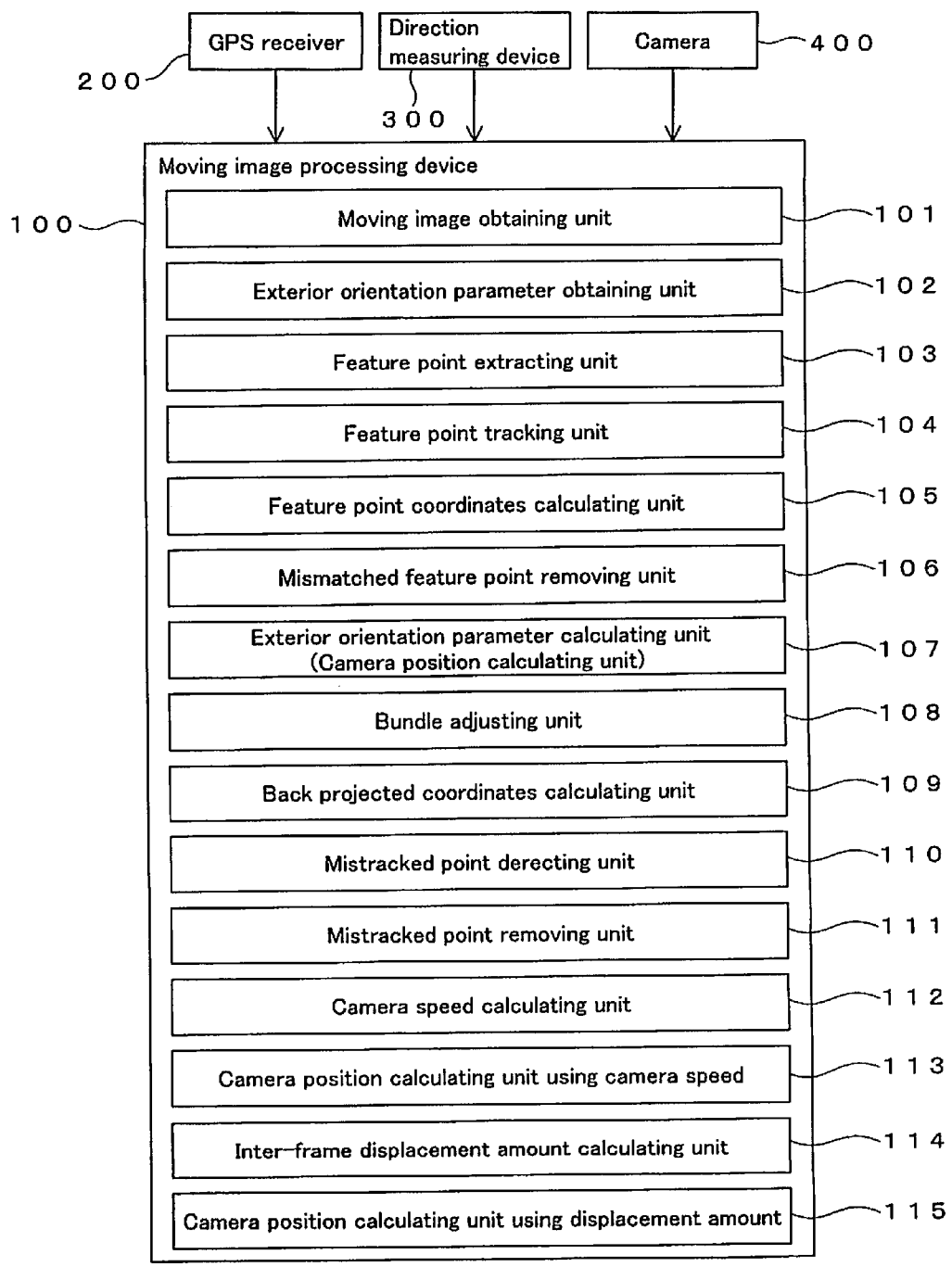
FIG. 2 is a block diagram of a moving image processing device of an embodiment.

FIG. 2 shows a block diagram of the moving image processing device 100. The moving image processing device 100 is a device functioning as a computer, and has a CPU, a RAM, a ROM, and various interface functions (not shown). For example, the moving image processing device 100 can also be formed by using a general-purpose computer. Part or all of sections of the moving image processing device 100 can also be formed by special hardware. A program for executing the moving image processing device 100 is stored in a data memory area in the moving image processing device 100, and is read to an appropriate memory area and is executed by the CPU in the moving image processing device 100.

The moving image processing device 100 is equipped with a moving image obtaining unit 101, an exterior orientation parameter obtaining unit 102, a feature point extracting unit 103, a feature point tracking unit 104, a feature point coordinates calculating unit 105, a mismatched feature point removing unit 106, an exterior orientation parameter calculating unit 107 (camera position calculating unit), a bundle adjusting unit 108, a back projected coordinates calculating unit 109, a mistracked point detecting unit 110, and a mistracked point removing unit 111. These function units are formed in a software-like manner, and have the following functions explained hereinafter. Function units denoted by reference numerals 112 to 115 are not used in this embodiment, and will be explained in the following embodiments hereinafter.

The moving image obtaining unit 101 receives data of moving images photographed by the camera 400. The exterior orientation parameter obtaining unit 102 obtains exterior orientation parameters (data of position and direction) of the camera 400. For example, the exterior orientation parameter obtaining unit 102 obtains exterior orientation parameters based on data of images photographed by the camera 400. The exterior orientation parameter obtaining unit 102 obtains exterior orientation parameters based on outputs from the GPS receiver 200 and the direction measuring device 300. In this case, the exterior orientation parameter obtaining unit 102 functions as a position obtaining device for obtaining position information from the camera 400 and functions as a direction obtaining device for obtaining data of directions of the camera 400 from the direction measuring device 300. The exterior orientation parameter obtaining unit 102 has a function for obtaining exterior orientation parameters based on information provided from external sections. The information provided from the external sections includes marks on the street and information obtained from optical beacons, radio beacons, and the like which are provided on the street and the road.

The feature point extracting unit 103 extracts feature points of the photographed object by software processing from frame images forming the moving images obtained by the moving image obtaining unit 101. In the extracting of the feature points, a differential filter (a Sobel filter, a Laplacian filter, a Prewitt filter, a Roberts filter, or the like) is used.

The feature point tracking unit 104 calculates matching relationship of feature points between different frame images, and tracks feature points which match between different frame images. The feature point tracking is performed by searching a matched point, which corresponds to a feature point extracted from one image, in another image. In the searching of the matched point, template matching (SSDA (Sequential Similarity Detection Algorithm), normalized correlation method, OCM (Orientation Code Matching) or the like) is used.

The feature point coordinates calculating unit 105 calculates three-dimensional coordinates of feature points extracted from photographed images of the object to be measured by using a forward intersection method. In the forward intersection method, directions from at least two known points to an unknown point are observed, and the position of the unknown point is determined as an intersection point of these directional lines.

The mismatched feature point removing unit 106 removes feature points regarded as points which do not exist on the street 500. That is, in this example, the object to be measured is the street 500, and the feature points are regarded as points which exist on the surface of the street 500. Therefore, height direction coordinates of the three-dimensional coordinates of feature points are limited to a predetermined range. The height direction coordinates of the three-dimensional coordinates of feature points are determined by using a threshold value, feature points which are out of a specific range of height direction are determined as feature points which are misdetected as positions apart from the street 500, and the feature points are removed as mismatched feature points. This processing is performed by the mismatched feature point removing unit 106. The threshold value used in the determination may be one calculated experimentally in advance.

The exterior orientation parameter calculating section 107 calculates exterior orientation parameters (positions and directions of the camera 400) based on a backward intersection method or a relative orientation method. In the backward intersection method, directions from an unknown point to at least three known points are observed, and the position of the unknown point is determined as an intersection point of these directional lines. As the backward intersection method, a single photo orientation or a DLT method (Direct Linear Transformation Method) may be used. Information of position of the camera 400 (position of the moving object 10), which changes every second in accordance with the movement of the moving object 10, is obtained by the exterior orientation parameter calculating section 107. In this viewpoint, the exterior orientation parameter calculating section 107 functions as a camera position calculating unit.

The bundle adjusting unit 108 performs bundle adjusting. The bundle adjusting is optimization processing for enhancing the calculation accuracy when the position and the direction of the camera 400 are calculated by using plural frame images photographed at different positions. The bundle adjusting will be explained in detail hereinafter. The back projected coordinates calculating unit 109 back-projects coordinates of the plural feature points of the photographed object to a frame image obtained by photographing from a specific position of the camera 400, obtains back-projected points, and calculates coordinates of the back-projected points (back-projected coordinates). The processing for calculating the back-projected coordinates will be explained in detail hereinafter.

The mistracked point detecting unit 110 detects mistracked points, which are mistracked by the feature point tracking unit 104, by using the back-projected coordinates calculated by the back projected coordinates calculating unit 109. The method for detecting mistracked points will be explained in detail hereinafter. The mistracked point removing unit 111 removes the mistracked points, which were detected by the mistracked point detecting unit 110, from data group of feature points.

One Example of Processing

Figure 3:
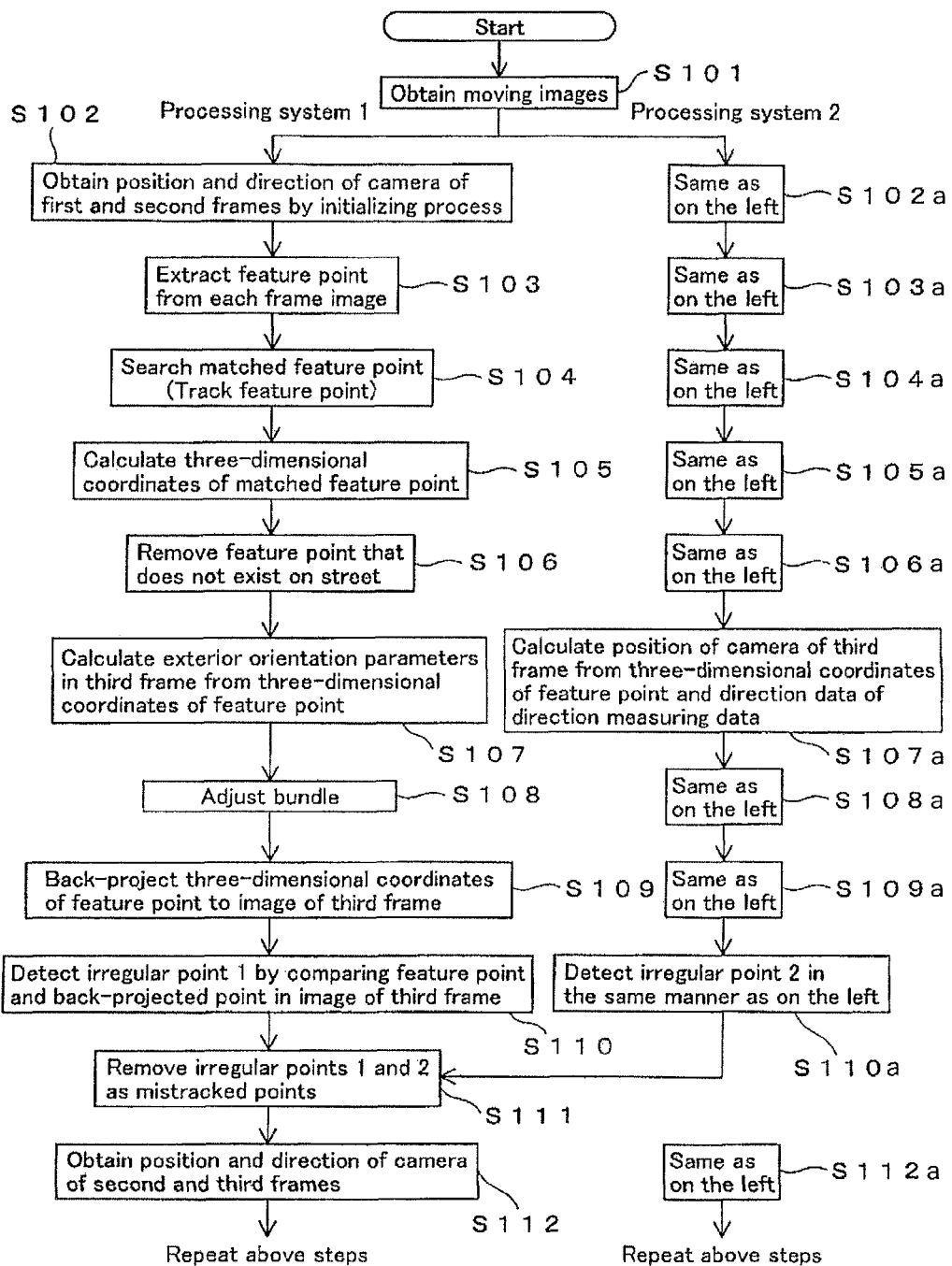
FIG. 3 is a flow chart showing one example of steps of processing of an embodiment.

One example of steps of processing for calculating position information of the moving object 10 in motion by using the moving image processing device 100 will be explained hereinafter. FIG. 3 is a flow chart showing one example of steps of processing performed by the moving image processing device 100. A program for executing the flow chart shown in FIG. 3 is stored in the appropriate data memory area in the moving image processing device 100, and is executed by the CPU in the moving image processing device 100. Alternatively, the program for executing the flow chart shown in FIG. 3 may be stored in an appropriate external storage media, and may be provided therefrom to the moving image processing device 100. This is true of programs for executing the flow chart shown in FIGS. 10 to 14 described hereinafter.

When the processing shown in FIG. 3 starts, first, image data of moving image photographed by the camera 400 is obtained by the moving image obtaining unit 101 (in step S101). The moving image is composed of plural continuous images photographed when the camera 400 and the object (in this case, the street 500) move slightly relatively to each other. Each of the plural continuous images is a frame image. The moving image obtaining unit 101 sequentially obtains plural frame images, which are obtained in a time-series manner, in real time.

After the data of the moving image is obtained, two processing systems are performed in parallel. One processing system may be partially performed, and after that, another processing system may be partially performed. Parallel processing may be performed in real time by using two CPUs. FIG. 3 shows processing systems 1 and 2. The processing system 1 is processing for calculating the position of the camera 400, which moves relatively to the street 500, every second. The processing system 2 is performed for detecting mistracked points (irregular points) of feature points of the object (street 500) to be measured, which are tracked and successive, and for inhibiting accuracy deterioration of the processing by the processing system 1 when the processing by the processing system 1 is repeated. In the flow chart shown in FIG. 3, although the processing systems 1 and 2 basically perform steps of the same processing, output sources of parameters used as initial values are different from each other. The processing system 1 will be primarily explained, and the processing system 2 will be explained secondarily. In the flow chart shown in FIG. 3, the steps of the processing, which are shown at corresponding left and right positions, are executed by the same function sections shown in FIG. 2. For example, the processing in the step S104 of the processing system 1 and the processing in the step S104' of the processing system 2 are executed by the feature point tracking unit 104 shown in FIG. 2.

After the data of the moving image is obtained, in the processing system 1, initialization processing is performed (in step S102). In the step S102, initial values of the position and the direction of the camera 400 are obtained. This processing is performed by the exterior orientation parameter obtaining unit 102. In this processing, initial values of interior orientation parameters and exterior orientation parameters of the camera 400 are calculated from an image in which a reference point, of which the position is clearly recognized, is photographed. The processing for obtaining the initial values will be explained in detail hereinafter.

First, a reference point is provided in a real space to be measured, three-dimensional coordinates of the reference point in the real space are measured by using a total station or a GPS. Alternatively, a reference point of which three-dimensional coordinates in the real space are known may be prepared. Next, the reference point is photographed by the camera 400, and initial values of interior orientation parameters and exterior orientation parameters of the camera are calculated by the backward intersection method based on the three-dimensional coordinates of the reference point and the image coordinates of the reference point in the frame image.

Alternatively, three-dimensional coordinate values of plural photographed positions may be provided by using the total station or the GPS, and the initial values of the exterior orientation parameters may be calculated from stereo images photographed at the plural photographed positions. Alternatively, plural images may be photographed while a reference plate, in which plural reference points are drawn, moves, without using the total station and the GPS. In this case, the distances between the reference points drawn in the reference plate are known values. Next, image coordinates of the reference points are calculated from the plural images, which are photographed with the reference points, and the initial values of the position and the direction of the camera 400 are obtained by using relative orientation or the like. In this case, the coordinates are in a local coordinate system. Specific calculation methods of the backward intersection method and the relative orientation will be described hereinafter.

In the processing (step S102$a$) of the processing system 2, which corresponds to the step S102 of the processing system 1, the same processing as in the step S102 is also performed, and data of the position and the direction of the camera 400 are obtained.

The processing returns to the processing system 1, and after the step S102, feature points are extracted from the frame images of the obtained moving image (in step S103). In this case, feature points are extracted from each of frame images of at least three frames (first frame, second frame, and third frame). This processing is performed by the feature point extracting unit 103 shown in FIG. 2. In the extracting of the feature points, a filter (a Moravec filter, a Laplacian filter, a Sobel filter, or the like) is used. In the processing system 2, the same processing as in the step S103 is also performed (in the step S103$a$).

After the extracting of the feature points, matched feature points are searched and tracked between different frame images (in step S104). In this case, matching relationship of feature points in the first frame, the second frame, and the third frame is determined. This processing is performed by the feature point tracking unit 104. In the processing system 2, this processing is also performed (in the step S104$a$). The information for determining the relationship of feature points in different frame images is embedded in each frame image.

Figure 4:
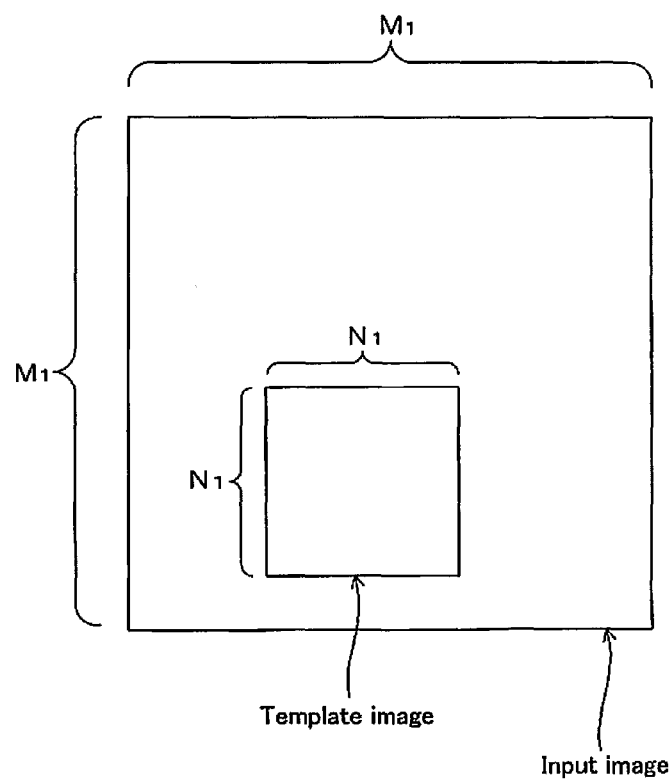
FIG. 4 is an explanatory diagram for explaining the principle of template matching.

In this example, in the tracking of the feature point, template matching is used. As the template matching, a SSDA method (Sequential Similarity Detection Algorithm), a cross-correlation coefficient method or the like is used. One example of the template matching will be explained hereinafter. The template matching is a method in which coordinate data of images in two coordinate systems is compared with each other and a matching relationship between two images is calculated by correlation relationship between the coordinate data. In the template matching, the matching relationship between feature points of images seen from each of two view-points is calculated. FIG. 4 is an explanatory diagram for explaining the principle of template matching. In this method, as shown in FIG. 4, the template image of $N_1 \times N_1$ pixels is moved on a searching range $(M_1-N_1+1)^2$ in the input image of $M_1 \times M_1$ pixels which is larger than the template image, and the left position of the template image is calculated so that the cross-correlation function $C(a, b)$ denoted by the following formula 1 represents the maximum value (that is, the cross-correlation degree becomes maximum).

$$C(a, b) = \sum_{m_1=0}^{N_1-1} \sum_{n_1=0}^{N_1-1} \frac{\{I_{(a,b)}(m_1 n_1) - \bar{I}\}\{T(m_1, n_1) = \bar{T}\}}{\sqrt{I_{\sigma ab} T_\sigma}} \quad \text{Formula 1}$$

Here, $$\bar{I} = \frac{1}{N_1^2} \sum_{m_1=0}^{N_1-1} \sum_{n_1=0}^{N_1-1} I_{(a,b)}(m_1, n_1)$$

$$\bar{T} = \frac{1}{N_1^2} \sum_{m_1=0}^{N_1-1} \sum_{n_1=0}^{N_1-1} T(m_1, n_1)$$

$$I_{\sigma ab} = \frac{1}{N_1^2} \sum_{m_1=0}^{N_1-1} \sum_{n_1=0}^{N_1-1} \{I_{(a,b)}(m_1, n_1) - \bar{I}\}^2$$

$$T_\sigma = \frac{1}{N_1^2} \sum_{m_1=0}^{N_1-1} \sum_{n_1=0}^{N_1-1} \{T(m_1, n_1) - \bar{T}\}^2$$

$I_{(a,b)}(m_1, n_1)$: Local image of input image $T(m_1, n_1)$: Template image

The above processing is performed while the magnification of the one image is changed and the one image is rotated. In a condition in which the correlation relationship becomes maximum, matched region of both the images is calculated, and feature points at this region are extracted, so that matched points are detected.

The matched portion of two compared images can be searched by using template matching, and the matching relationship between the two images can be obtained. In this method, the relative position relationship between the two images is determined so that the correlation relationship between the two images becomes maximum. The correlation relationship between the two images is determined by the feature points of the two images.

After the feature points are tracked in the step S104, three-dimensional coordinates of the matched feature points in the plural frame images (in this case, the frame image of the first frame and the frame image of the second frame) are calculated (in step S105). This processing is performed by the feature point coordinates calculating unit 105 shown in FIG. 2.

Figure 5:
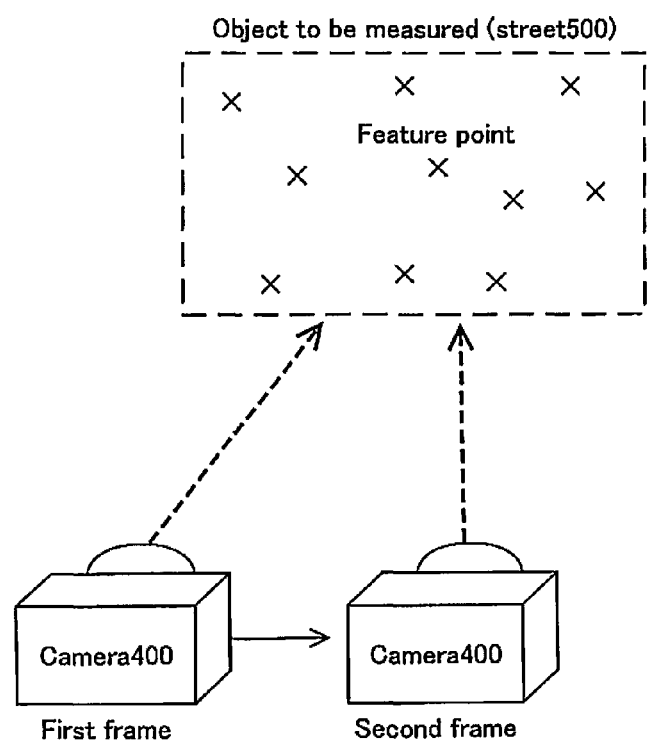
FIG. 5 is a conceptual diagram showing a relationship between a moving camera and a feature point of an object to be measured.

In this example, the two frame images (the frame image of the first frame and the frame image of the second frame), which are obtained from different positions at time lag, are used as stereo pair images, and three-dimensional coordinates of feature points of which the matching relationship is determined in the two frame images are calculated by the principle of triangulation. FIG. 5 is a conceptual diagram showing this condition. As shown in FIG. 5, in photographing the second frame, the camera 400 moves in the right direction of FIG. 5 in comparison with the case of photographing the first frame. Therefore, two frame images, in which plural feature points (denoted by "x" marks) of the object to be measured are photographed from different two positions and directions, are obtained at short time lag (not simultaneously). In this case, the position and the direction of the camera 400 in the first frame and the position and the direction of the camera 400 in the second frame are obtained in the step S102 (step S102a) and known, so that three-dimensional coordinates of the feature points can be calculated by the principle of stereophotogrammetry. This is basic principle of the processing by the feature point coordinates calculating unit 105 explained in this example.

One example of the step of the above processing will be explained in detail hereinafter. Three-dimensional coordinates of the matched feature points, of which the matching relationship is determined in the frame images of the first frame and the second frame, are calculated by using a forward intersection method. In the following description, although the processing in the step S105 of the processing system 1 will be explained, the processing in the step S105a is the same processing as that in the step S105.

Figure 6:
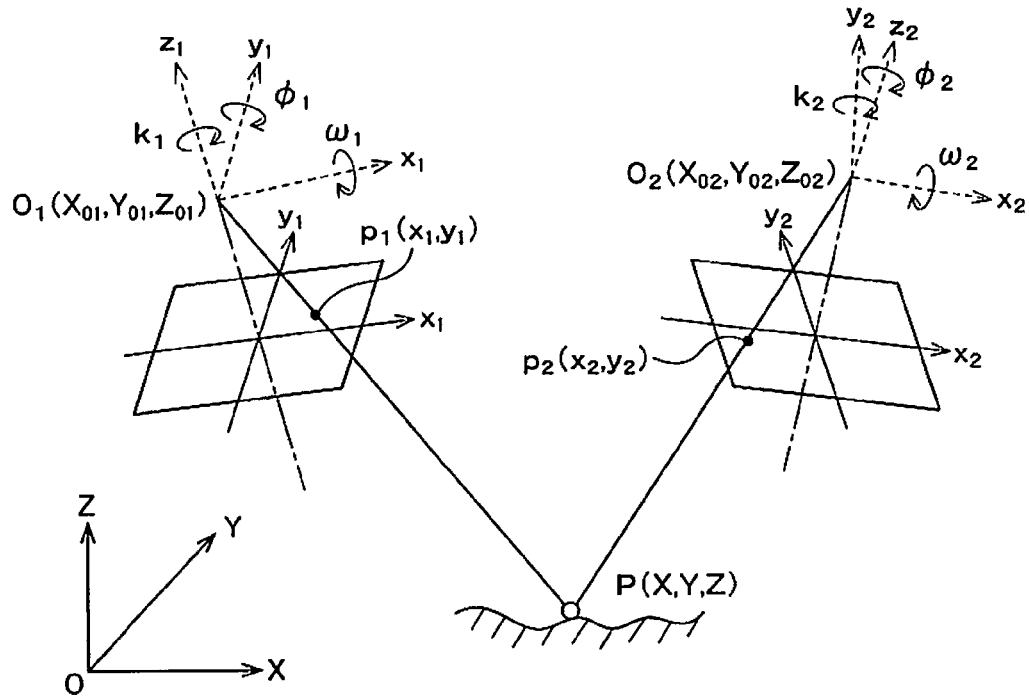
FIG. 6 is an explanatory diagram for showing a forward intersection method.

FIG. 6 is an explanatory diagram for explaining a forward intersection method. In the forward intersection method, directions from at least two of known points ($O_1$, $O_2$) to an unknown point P are observed, and the position of the unknown point P is determined as an intersection point of these directional lines. As shown in FIG. 6, a coordinate system of an objective space is assumed to be O-XYZ. Coordinates ($X_{O1}$, $Y_{O1}$, $Z_{O1}$) of a projection center $O_1$ of a camera and tilts ($\omega_1$, $\phi_1$, $\kappa_1$) of camera coordinate axes in a frame image of a first frame, and coordinates ($X_{O2}$, $Y_{O2}$, $Z_{O2}$) of a projection center $O_2$ the camera and tilts (attitude) ($\omega_2$, $\phi_2$, $\kappa_2$) of camera coordinate axes in a frame image of a second frame, are known values which are obtained in the step S102. In addition, internal orientation parameters (focal point distance, principal point position, and lens distortion coefficient) are also known values.

A point $p_1$ ($x_1$, $y_1$) in the frame image of the first frame and a point $p_2$ ($x_2$, $y_2$) in the frame image of the second frame, which corresponds to the point $p_1$, are obtained from the respective frame images. Thus, a feature point P (X, Y, Z) which is an unknown point in the objective space is determined as an intersection point of a light ray ($O_1p_1$) and a light ray ($O_2p_2$). In this case, the two light rays do not intersect accurately because there are essentially errors, and therefore, the intersection position is obtained by the least-squares method. Specifically, a collinearity conditional formula (formula 2) for the two light rays is formed. The exterior orientation parameters, the internal orientation parameters, and the image coordinates of the matched points, all of which are known values, are substituted in the formula 2.

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad \text{Formula 2}$$

$$x = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y$$

x, y: Image coordinates in frame image
c: Principal distance (Focal point distance)
X, Y, Z: Objective space coordinates (Three-dimensional coordinates of target feature point)
$X_0$, $Y_0$, $Z_0$: Photographing position of camera
$a_{00}$~$a_{22}$: Rotation matrix denoting direction of camera
$\Delta x$, $\Delta y$: error adjustment value Moreover, approximate values including correction amounts of the unknown point P are substituted in the collinearity conditional formula. In this case, the approximate values of the unknown point P are represented as (X', Y', Z'), and the approximate values including the correction amounts are represented as (X'+$\Delta X$, Y'+$\Delta Y$, Z'+$\Delta Z$). The formula 2 is expanded by using Taylor's formula about the approximate value and is linearized. Then, the correction amounts are calculated by the least-squares method. The approximate values are corrected according to the calculated correction amounts, and the above calculations are repeated in the same manner, so that convergence results are obtained. The three-dimensional coordinates P (X, Y, Z) of the feature point is calculated by this step. This step is performed on all feature points, and three-dimensional coordinates of the plural feature points, of which the matching relationship is determined in the frame images of the first frame and the second frame, are calculated. The above example is one detail example of the processing in the step S 105. The same processing is also performed in the step S105a.

After the step S105, feature points, which have height positions apart from the street 500, are detected and removed as irregular points by using threshold value (in step S106). This processing is performed by the mismatched feature point removing unit 106. The same processing is also performed in the processing system 2 (in step S106a). The steps S106 and S106a may be omitted.

After the step S106, exterior orientation parameters of the camera 400 in the third frame are calculated based on the three-dimensional coordinates of feature points of the object to be measured (in step S107). The position and the direction of the camera 400 in the third frame are calculated by this processing. This processing is performed by the exterior orientation parameter calculating unit 107. In this example, the calculation of the exterior orientation parameters of the camera 400 is performed by using a backward intersection method.

Figure 7:
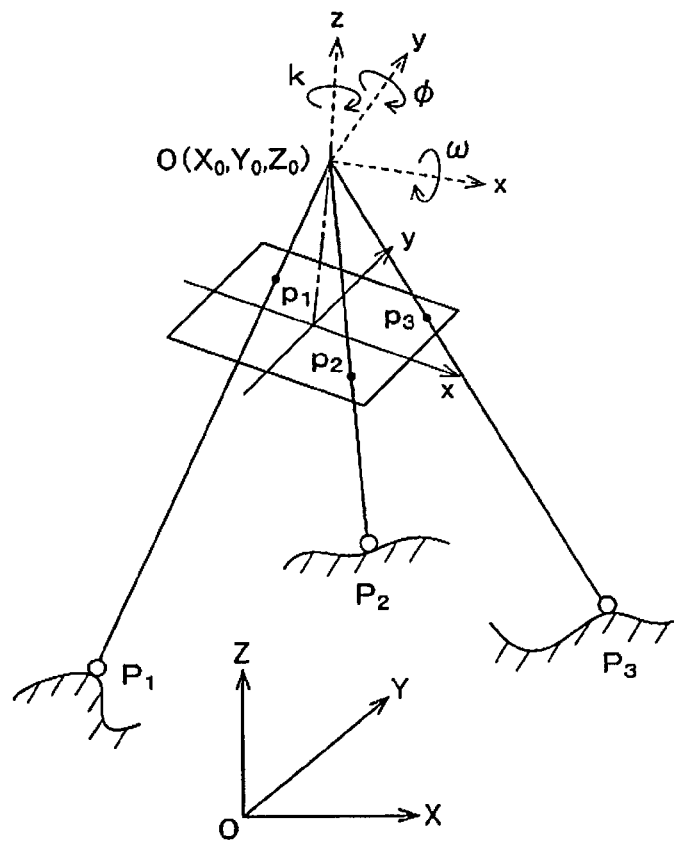
FIG. 7 is an explanatory diagram for explaining a backward intersection method.

One example of calculation in the step S107 will be explained in detail hereinafter. FIG. 7 is an explanatory diagram for explaining a backward intersection method. In the backward intersection method, directions from an unknown point O to at least three known points $P_1$, $P_2$, $P_3$ are observed, and the position of the unknown point O is determined as the intersection point of these directional lines. In this example, the three-dimensional coordinates of feature points of the object to be measured are used as reference points $P_1$, $P_2$, $P_3$ shown in FIG. 7, and exterior orientation parameters ($X_0$, $Y_0$, $Z_0$, $\omega$, $\phi$, $\kappa$) of the camera 400 in the third frame are calculated by the backward intersection method based on three-dimensional coordinates of reference points $P_1$, $P_2$, $P_3$. A single photo orientation, a DLT method, or a relative orientation is used as the backward intersection method.

A case, in which the exterior orientation parameters ($X_0$, $Y_0$, $Z_0$, $\omega$, $\phi$, $\kappa$) of the camera 400 in the third frame are calculated by using the single photo orientation, will be explained with reference to FIG. 7. In the single photo orientation, a position O ($X_0$, $Y_0$, $Z_0$) and a direction ($\omega$, $\phi$, $\kappa$) of a camera, which is used for taking a photograph, are calculated by using a collinearity condition formed on a reference point in the photograph. The collinearity condition is a condition in which a projection center O, a photographic image ($p_1$, $p_2$, $p_3$), and objective points ($Op_1P_1$, $Op_2P_2$, $Op_3P_3$) to be measured are on one straight line. In this case, the objective points are feature points. The position O ($X_0$, $Y_0$, $Z_0$) of the camera and the direction ($\omega$, $\phi$, $\kappa$) of the camera are exterior orientation parameters.

First, the camera coordinate system is assumed to be (x, y, z), the photographic coordinate system (image coordinate system) is assumed to be (x, y), and the ground coordinate system, which is coordinate system of the object to be measured, is assumed to be (X, Y, Z). It is assumed that photographs are taken by turning the camera to left by $\omega$, $\phi$, $\kappa$ with respect to the positive direction in each coordinate axis in series. Next, three-dimensional coordinates of reference points corresponding to 4 image coordinates (only 3 points are shown in FIG. 7) are substituted in a second degree perspective projection formula which is represented by the following formula 3. Then, observation equations are made, and thereby parameters b1 to b8 are calculated.

$$X = \frac{b1 \cdot x + b2 \cdot y + b3}{b7 \cdot x + b8 \cdot y + 1} \quad \text{Formula 3}$$

$$Y = \frac{b4 \cdot x + b5 \cdot y + b6}{b7 \cdot x + b8 \cdot y + 1}$$

X, Y: Ground coordinates of the reference points
x, y: Image coordinates of the reference points By using the parameters b1 to b8 in the formula 3, exterior orientation parameters ($X_0$, $Y_0$, $Z_0$, $\omega$, $\phi$, $\kappa$) are calculated from the following formula 4. The position ($X_0$, $Y_0$, $Z_0$) is the coordinates denoting the position of the camera 400 in the third frame, and the direction ($\omega$, $\phi$, $\kappa$) is the direction of the camera 400 at the above position thereof.

$\omega = \tan^{-1}(C \cdot b8)$ $\phi = \tan^{-1}(-C \cdot b7 \cdot \cos \omega)$ $\kappa = \tan^{-1}(-b4/b1)(\phi=0)$ $\kappa = \tan^{-1}(-b2/b5)(\phi \ne 0, \omega=0)$ $\kappa = \tan^{-1}\{-(A1 \cdot A3 - A2 \cdot A4)/(A1 \cdot A2 - A3 \cdot A4)\}(\phi \ne 0, \omega \ne 0)$ $Z_0 = C \cdot \cos \omega \{(A2^2 + A3^2)/(A1^2 + A4^2)\}^{1/2} + Zm$ $X_0 = b3 - (\tan \omega \cdot \cos \kappa / \cos \phi - \tan \phi \cdot \sin \kappa) \times (Zm - Z_0)$ $Y_0 = b6 - (\tan \omega \cdot \cos \kappa / \cos \phi - \tan \phi \cdot \sin \kappa) \times (Zm - Z_0)$ Formula 4

Here, $A1 = 1 + \tan^2 \phi$ $A2 = B1 + B2 \cdot \tan \phi / \sin \omega$ $A3 = B4 + B5 \cdot \tan \phi / \sin \omega$ $A4 = \tan \phi / (\cos \phi \cdot \tan \omega)$ Zm: Average elevation of 4 reference points (here, 4 reference points are coordinates on the same plain, so the elevation is assumed to be fixed.)

C: Focal length

As described above, the coordinates of the three-dimensional position and the direction of the camera 400 in the third frame are calculated by the single photo orientation based on the three-dimensional coordinates of the feature points of the object (street 500) to be measured.

Next, the step will be explained in which the position and the direction of the camera 400 in the third frame are calculated by the DLT method based on the three-dimensional coordinates of the feature points of the object (street 500) to be measured. The DLT method approximates a relationship between image coordinates and three-dimensional coordinates of an objective space by using a third degree perspective projection formula. The basic formula of the DLT method is the following formula 5. The detail of the DLT method may be found in "Shunji Murai: Analytical Photogrammetry, pages 46 to 51 and pages 149 to 155" or the like.

$$x = \frac{L_1 X + L_2 Y + L_3 Z + L_4}{L_9 X + L_{10} Y + L_{11} Z + 1} \quad \text{Formula 5}$$

$$y = \frac{L_5 X + L_6 Y + L_7 Z + L_8}{L_9 X + L_{10} Y + L_{11} Z + 1}$$

x, y: Image coordinates of the reference points or unknown points

X, Y, Z: Ground coordinates of the reference points or unknown points $L_1$ to $L_{11}$: Unknown parameters in the DLT method By deleting the denominator in the formula 5, a linear formula of a formula 6 is derived.

$XL_1 + YL_2 + ZL_3 + L_4 - xXL_9 - xYL_{10} - xZL_{11} = x$ $XL_5 + YL_6 + ZL_7 + L_8 - yXL_9 - yYL_{10} - yZL_{11} = y$ Formula 6

Moreover, the formula 6 is converted into the following formula 7.

$$\begin{vmatrix} X & Y & Z & 1 & 0 & 0 & 0 & 0 & -xX & -xY & -xZ \\ 0 & 0 & 0 & 0 & X & Y & Z & 1 & -yX & -yY & -yZ \end{vmatrix} \begin{vmatrix} L_1 \\ L_2 \\ L_3 \\ L_4 \\ L_5 \\ L_6 \\ L_7 \\ L_8 \\ L_9 \\ L_{10} \\ L_{11} \end{vmatrix} = \begin{vmatrix} x \\ y \end{vmatrix} \quad \text{Formula 7}$$

By substituting three-dimensional coordinates of at least six of the reference points in the formula 7 and by solving with the least-squares method, 11 of unknown variables from $L_1$ to $L_{11}$, which determine the relationship between the image coordinates (photographic coordinates) and the object coordinates, are obtained. The $L_1$ to $L_{11}$ include the exterior orientation parameters.

Next, a calculation of exterior orientation parameters using the relative orientation method will be explained. In the relative orientation, relative exterior orientation parameters are obtained even without known points. If there are known points, absolute coordinates are obtained by performing an absolute orientation.

Figure 8:
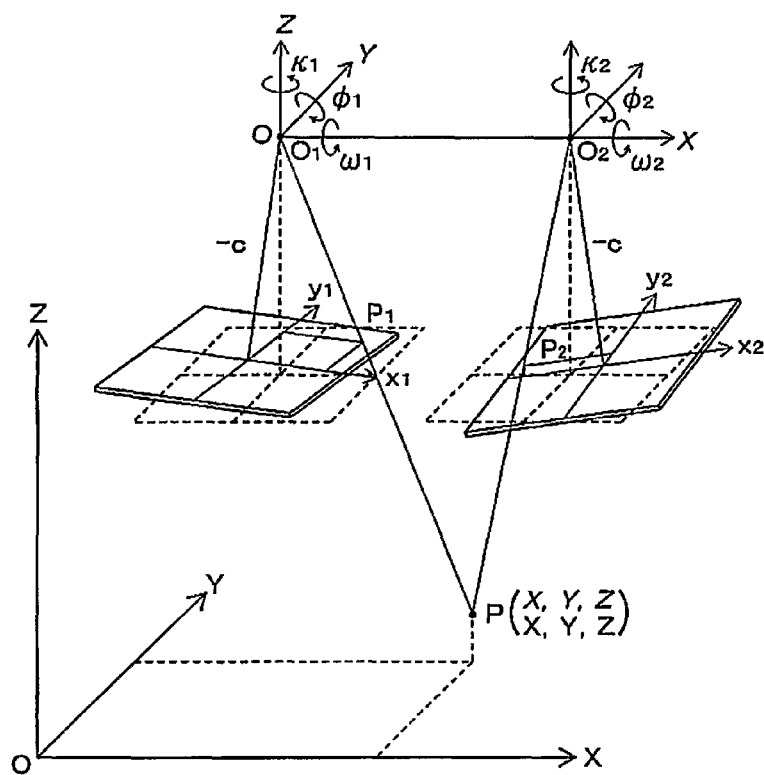
FIG. 8 is an explanatory diagram for explaining a relative orientation.

FIG. 8 is an explanatory diagram for explaining a relative orientation. In the relative orientation, exterior orientation parameters are calculated by using at least six corresponding points in right and left images. In the relative orientation, a coplanar condition, in which two light rays connect projection centers $O_1$, $O_2$ and a reference point P must be in the same plane, is used. The coplanar conditional formula is represented in the following formula 8. In this case, for example, the left image is the frame image of the second frame, and the right image is the frame image of the third frame.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \quad \text{Formula 8}$$

$X_{01}$, $Y_{01}$, $Z_{01}$: Coordinates of projected center on the left image $X_{02}$, $Y_{02}$, $Z_{02}$: Coordinates of projected center on the left image $X_1$, $Y_1$, $Z_1$: Coordinates of projected center on the left image $X_2$, $Y_2$, $Z_2$: Coordinates of projected center on the left image As shown in FIG. 8, an origin point of a model coordinate system is assumed to be a projection center $O_1$ on the left image, and a line connecting to a projection center $O_2$ on the right image is assumed to be an X-axis. In scale, the length of the baseline is assumed to be a part length. In this case, five parameters (five rotary angles) are obtained: a rotary angle $\kappa_1$ of the Z-axis and a rotary angle $\phi_1$ of the Y-axis of the left camera, and a rotary angle $\kappa_2$ of the Z-axis, a rotary angle $\phi_2$ of the Y-axis, and a rotary angle $\omega_2$ of the X-axis of the right camera. Since the rotary angle $\omega_1$ of the X-axis of the left camera is zero, it need not be taken into consideration. Under these conditions, the coplanar conditional formula of the formula 8 is converted into the formula 9, and respective parameters are calculated by solving this formula 9.

$$F(\kappa_1' \; \phi_1' \; \kappa_2' \; \phi_2' \; \omega_2) = \begin{vmatrix} Y_1 & Z_1 \\ Y_2 & Z_2 \end{vmatrix} = Y_1 Z_2 - Y_2 Z_2 = 0 \quad \text{Formula 9}$$

$\kappa_1$: Left camera's rotary angle about Z-axis
$\phi_1$: Left camera's rotary angle about Y-axis
$\kappa_2$: Right camera's rotary angle about Z-axis
$\phi_2$: Right camera's rotary angle about Y-axis
$\omega_2$: Right camera's rotary angle about X-axis Here, the relationship for converting coordinates shown in the following formula 10 is formed between the model coordinate system XYZ and the camera coordinate system xyz.

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 0 \end{pmatrix} \begin{pmatrix} x_1 \\ y_1 \\ -c \end{pmatrix} \quad \text{Formula 10}$$

$$= 0$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix}$$

$$\begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Unknown parameters (exterior orientation parameters) are calculated by the following steps using the above formulas.

(1) Assume initial approximate values of the unknown parameters ($\kappa_1$, $\phi_1$, $\kappa_2$, $\phi_2$, $\omega_2$) to be zero as a rule.

(2) Expand the coplanar conditional formula of the formula 8 using Taylor's formula about the approximate values, and make it linear. Calculate the differential coefficients from the formula 9, and make observation formulas.

(3) Calculate correction amount for the approximate values by the least-squares method.

(4) Correct the approximate values.

(5) Use the corrected approximate values, and repeat the steps (1) to (4) until the result converges.

When the relative orientation is converged, a successive orientation is then performed. In the successive orientation, the tilt and the scale between each model are unified so as to be in the same coordinate system. When this processing is performed, successive differences shown in the following formula 11 are calculated. As a result, if the successive differences $\Delta Zj$ and $\Delta Dj$ are predetermined values (for example, 0.0005 (1/2000)) or less, it is evaluated that the successive orientation is completed normally.

$$\Delta X_j = (X_{jr} - X_{j1})/(Z_0 - Z_{jl})$$

$$\Delta Y_j = (Y_{jr} - Y_{j1})/(Z_0 - Z_{jl})$$

$$\Delta Z_j = (Z_{jr} - Z_{j1})/(Z_0 - Z_{jl})$$

$$\Delta D_j = \sqrt{(\Delta X_j^2 + \Delta Y_j^2)} \quad \text{Formula 11}$$

$(X_{j1}, Y_{j1}, Z_{j1})$: The j-th left model in the unified coordinate system $(X_{jr}, Y_{jr}, Z_{jr})$: The j-th right model in the unified coordinate system The position and the direction of the camera 400 in the third frame are calculated by the relative orientation. After that, bundle adjusting may be performed (in steps S108 and S108a). The bundle adjustment is performed by the bundle adjusting unit 108. The bundle adjusting method uses a collinearity condition such that light fluxes (bundles), which connect a feature point of the object to be measured, a point in the frame image, and the projection center, must be on the same straight line. In the bundle adjusting, an observation equation is formed for each of the light flux in each image based on the collinearity condition, and simultaneous adjusting is performed by the least-squares method, so that the exterior orientation parameters of the camera 400 and the three-dimensional coordinates of the feature point of the object to be measured in the third frame are optimized. The bundle adjusting uses the collinearity conditional formula of the formula 2 described above. The respective parameters in the formula 2 have the following relationship denoted by the formula 12.

$$\begin{pmatrix} x \\ y \\ z \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix}$$
$$\begin{pmatrix} \cos\kappa & -\sin\kappa & 0 \\ \sin\kappa & \cos\kappa & 0 \\ 0 & 0 & 1 \end{pmatrix} \begin{pmatrix} X - X_0 \\ Y - Y_0 \\ Z - Z_0 \end{pmatrix}$$
$$= \begin{pmatrix} a11 & a12 & a13 \\ a21 & a22 & a23 \\ a31 & a32 & a33 \end{pmatrix} \begin{pmatrix} X - X_0 \\ Y - Y_0 \\ Z - Z_0 \end{pmatrix}$$

Formula 12

In the bundle adjusting, a successive approximation method is used. Specifically, approximate values of the three-dimensional coordinates of the reference point and the feature points, and approximate values of the exterior orientation parameters, are represented as (X', Y', Z') and ($X_0'$, $Y_0'$, $Z_0'$, $\omega'$, $\phi'$, $\kappa'$), respectively. Then, correction amounts are added to the approximate values, so that (X'+ΔX, Y'+ΔY, Z'+ΔZ) and ($X_0'$+Δ$X_0$, $Y_0'$+Δ$Y_0$, $Z_0'$+Δ$Z_0$, $\omega'$+Δω, $\phi'$+Δφ, $\kappa'$+Δκ) are obtained. These approximate values including the correction amounts are used as true values of the three-dimensional coordinates of the reference point and the feature points and the exterior orientation parameters. Measured values of the image coordinates corresponding to the reference point and the feature points are represented as (x', y'). Then, errors are added to the measured values, so that (x'+dx, y'+dy) are obtained and are used as true values of the image coordinates corresponding to the reference point and the feature points. The approximate values including the correction amounts and the measured values including the errors are substituted in the collinearity conditional formula (formula 2) of one or more images. The formula 2 is expanded by using Taylor's formula about the approximate value and is linearized. Then, correction amounts are calculated by the least-squares method. The approximate values are corrected by the calculated correction amounts, and the above calculations are repeated in the same manner, so that convergence results are obtained. The bundle adjusting using a few tens or all of images may be performed as post-processing.

The following formula 13 represents a compensatory model of internal orientation parameters in a case in which a lens has distortion in a radiation direction. The internal orientation parameters can also be adjusted at the same time by using the formula 13. That is, the bundle adjusting includes self-calibration. The symbols Δx and Δy represent correction terms of the internal orientation parameters (focal point distance, principal point position, and lens distortion coefficient).

$$\Delta x = x_0 + x(k_1 r^2 + k_2 r^4)$$

$$\Delta y = y_0 + y(k_1 r^2 + k_2 r^4)$$

$$r^2 = (x^2 + y^2)/c^2$$

Formula 13 c: Focal point distance x,y,z: Image coordinates
X,Y,Z: Objective space coordinates (reference point, unknown point)
$X_0$, $Y_0$, $Z_0$: Projection centers (photographing position of a camera)
$\alpha_{11}$–$\alpha_{33}$: Direction of a camera (parameters of 3×3 rotation matrix)
Δx, Δy: Correction terms of internal orientation of a camera
ω,φ,κ: Direction of a camera (angles of x,y,z axes rotated from X,Y,Z axes)
$k_1$, $k_2$: Lens distortion coefficients in radiation direction Next, the processing in step S107a of the processing system 2 will be explained. In the step S107a, exterior orientation parameters in the third frame are calculated by using conditions of output sources different from those of the processing system 1. In this example, data of the direction of the camera 400 in the third frame is obtained from the direction measuring device 300. Based on this data and the three-dimensional coordinates of plural feature points of the object to be measured, which are obtained from the frame images of the first frame and the second frame, the position of the camera 400 in the third frame is calculated.

In the step S107a, a single photo orientation, a DLT method, or relative orientation is used. In the single photo orientation, values obtained by the direction measuring device 300 are substituted for the direction (ω, φ, κ) in the formula 4, and the position of the camera 400 in the third frame is calculated. In the DLT method, since the variables $L_1$ to $L_{11}$ include the exterior orientation parameters of the direction (ω, φ, κ), the variables $L_1$ to $L_{11}$ are calculated based on values obtained by the direction measuring device 300, and the position of the camera 400 in the third frame is calculated. In the relative orientation, values (the directions in photographing of the second frame and in photographing of the third frame) from the direction measuring device 300 are substituted for the parameters ($\kappa_1$, $\phi_1$) and ($\kappa_2$, $\phi_2$, $\omega_2$) in the formula 9, and the position of the camera 400 in the third frame is calculated.

The same bundle adjusting as that in the processing system 1 may also be performed in the processing system 2 (in the step S108a). After the step S108, the processing proceeds to step S109. In the step S109, three-dimensional coordinates of plural feature points calculated in the step S105 are back-projected to the frame image (actual image) of the third frame by using the position of the camera in the third frame obtained in the step S107, back-projected points are obtained, coordinates of the back-projected points (back-projected coordinates) are calculated. This processing is performed by the back projected coordinates calculating unit 109.

Figure 9:
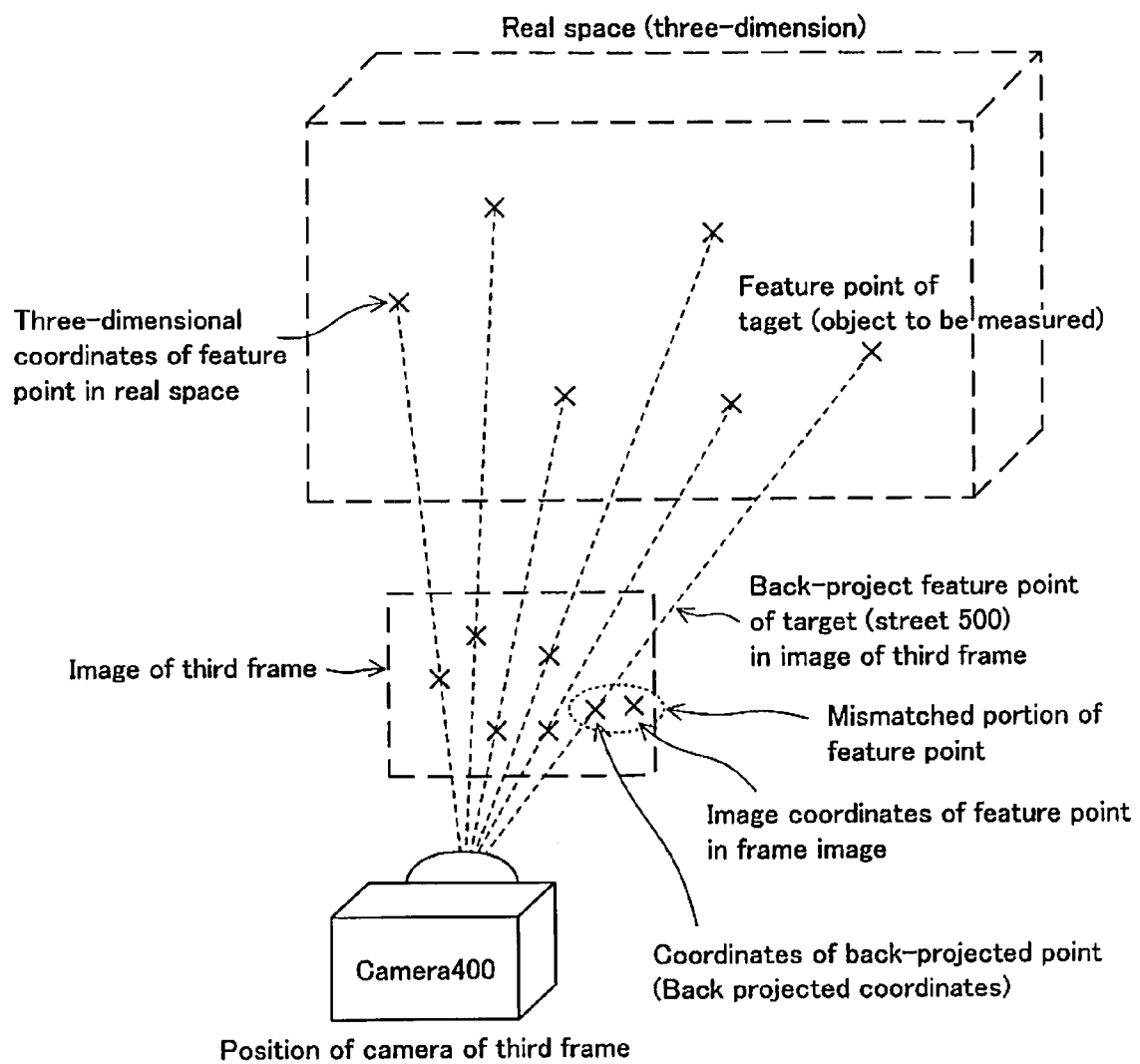
FIG. 9 is a conceptual diagram for explaining back projected coordinates.

FIG. 9 is a conceptual diagram for explaining the processing by the step S109. In this processing, the frame image of the third frame is virtually disposed between the position of the camera 400 and the object to be measured. This position of the camera 400 in the frame image of the third frame was calculated in the step S107 and is known at this time. The above position of the camera 400 is used as a reference point, the feature points in the real space are back-projected to the frame image of the third frame, and coordinates (back-projected coordinates) of the back-projected points are calculated. In this case, the feature points in the frame images of the first frame to the third frame were extracted in the step S103, the matching relationships therebetween were calculated in the step S104, and the exterior orientation parameters (position and the direction) of the camera 400 in the third frame were obtained in the step S107. Thus, the above processing of the calculation of back-projected coordinates is performed in a software-like manner.

In the processing of the calculation of the back-projected coordinates, each of the three-dimensional coordinates of the plural feature points of the object to be measured in the real space and the position of the camera 400 in the third frame is connected by a line. These three-dimensional coordinates of the plural feature points are calculated based on the frame images of the first frame and the second frame. An intersection point of the line and a surface of the frame image (actual image) of the third frame is determined as a back-projected point of each feature point in the real space. This situation is conceptually shown in FIG. 9. The same processing as in the step S109 is performed in step S109a.

After the calculation of the back-projected coordinates in the step S109, the feature points in the frame image of the third frame (feature points in the actual image) and the projected points (back-projected points) of the feature points from the real space are compared, and irregular points (hereinafter referred to as "irregular points 1") in the processing system 1 are detected (in step S110). That is, if scale reduction of the frame image, to which the feature points are back-projected, is appropriately adjusted, the position of the feature point in the frame image and the position of the projected point (back-projected point) of the feature point from the real space are ideally matched. However, errors may be generated due to various factors, and the position of the feature point in the frame image and the position of the projected point of the feature point from the real space may be mismatched (or, they may be matched). In the step S110, this mismatching is detected by using a threshold value. This threshold value used in determination may be one calculated experimentally in advance.

As shown in FIG. 9, at a portion A surrounded by the broken line in a magnified manner, the position of the projected point (back-projected point) of the feature point in the real space, which is back-projected to the frame image, and the image coordinate of the feature point in the frame image are mismatched. This mismatching occurs due to the following reason. Since the image coordinate of the feature point in the frame image is a position in the photographed image, errors may be relatively very small even when there are distortions of the lens system, errors in the processing of the extracting of the feature points, influence of noise in data making, and the like. On the other hand, in addition to the above factors of the errors, three-dimensional coordinates of the feature points in the real space further may have errors generated in the processing in the step S104, in the calculation in the step S105, and in the calculation in the step S107. In particular, the calculation in the steps S105 and S107 include approximate calculation, thereby have a great influence on the errors.

For the above reasons, visible errors shown in the portion A in FIG. 9 may be generated due to the small error factors. The degree of the errors generated at the back-projected coordinates may be obvious (emphasized) since errors generated in the calculations are accumulated. This tendency is true of step S110a of the processing system 2 in FIG. 3. Irregular points detected in the step S110a are described as irregular points 2 in order to distinguish between the irregular points detected in the step S110 and in the step S110a.

In general, the irregular points 1 and 2 do not always correspond with each other. This is for the following reason. As described above, in the step S107 (also in the step S107a), for example, as shown in the formula 2, the calculation results are greatly influenced by the parameter denoting the direction of the camera 400.

In the processing systems 1 and 2 shown in FIG. 3, in the step S107 (the step S107a) for performing the calculation of the exterior orientation parameters, output sources of data of the direction of the camera 400, which is used as the initial value, are different. This difference influences the calculations in the steps S107 and S107a, and this influences the matching errors shown by the portion A in FIG. 9. Specifically, the feature point detected as an irregular value in the step S110 of the processing system 1 is not detected as an irregular value in the step S110a of the processing system 2, and a case opposite to the above case occurs. If the processing substances of the steps S107 and S107a are the same and the exterior orientation parameters are obtained from the same source, the above difference is not generated.

After the step S110, the irregular points 1 and 2 are removed as feature points (mistracked points) which were not appropriately tracked. The irregular points 1 and 2 may correspond with each other.

In the step S111, the processing system 2 is once completed. The processing system 1 goes from the step S111 to the step S112. In the step S112 and the following steps, the processing in the steps S102 to S111 is basically repeated. This repetition of the processing is performed sequentially, so that exterior orientation parameters of the camera 400 in (n+3)th frame are sequentially calculated by the processing performed on (n+1)th frame, (n+2)th frame, and the (n+3)th frame. The "n" is a natural number. The calculation of the exterior orientation parameters of the camera 400, which dynamically changes, is performed every second, and data of the change in the position of the camera 400 (the change in the position of the moving object 10) is calculated.

The data of the position of the camera 400 (position of the moving object 10), which is calculated by the processing corresponding to the step S107 in each cycle of the processing system 1, is sequentially output from the moving image processing device 100 to an external section, and for example, and this data is input to a navigation system of the moving object 10 (not shown in the Figures). Based on this input, the navigation system (not shown in the Figures) displays position information of the camera 400 (the moving object 10), which changes every second, on a displayed map information. The position information of the camera 400 (the moving object 10) output from the moving image processing device 100 can also be used for another purpose.

In this technique, even when information from the GPS is interrupted or accuracy of information from the GPS is deteriorated, the position information of the moving object 10, which changes every second, can be tracked, or in environments at which information cannot be obtained from the GPS, the position information of the moving object 10 can be tracked.

The processing in the step S112 and the following steps will be explained hereinafter. In the step S112, exterior orientation parameters (position and direction) of the camera 400 in the second frame and the third frame are obtained by the exterior orientation parameter obtaining unit 102. The exterior orientation parameters in the second frame was provided as initial values in the step S102, and the exterior orientation parameters in the third frame was obtained by the calculation in the step S107.

For example, in processing in step S112 of a second processing cycle, at this time, the exterior orientation parameters in the (n−1)th frame (=third frame) and the (n−2)th frame (=second frame) are known and are obtained by the exterior orientation parameter obtaining unit 102. In a third processing cycle, in processing corresponding to the step S112, exterior orientation parameters in the (n−1)th frame (=fourth frame) and the (n−2)th frame (=third frame), which are known at this time, are obtained. In this case, the exterior orientation parameters in the fourth frame were calculated in processing corresponding to the step S107 of the second processing cycle. Thus, in processing corresponding to the step S112 in a cycle calculating the exterior orientation parameters in the (n)th frame, the exterior orientation parameters in the (n−1)th frame and the (n−2)th frame are obtained.

In processing (not shown in the Figures) corresponding to the step S103 after the step S112, new feature points are extracted from frame images to be processed. In this case, re-extracting of feature points is performed at a region at which the mistracked points were removed in the processing in the previous cycle and the density of the feature points is decreased. This re-extracting of feature points is performed by the feature point extracting unit 103. For example, after the step S112, re-extracting of new feature points is performed on the frame image of the fourth frame. At this time, although the feature points in the second frame and the third frame are known, at the step S111, the mistracked points are removed, so that the number of the feature points is decreased. Thus, re-extracting of feature points is performed at the region, which has the decreased density of the feature points, on the second frame and the third frame, so that decreased feature points are compensated. Specifically, the feature point extracting unit 103 divides the frame image, on which the extracting of the feature points has been performed, into plural regions. The feature point extracting unit 103 counts each density of feature points at the divided regions, and re-extracts feature points at the region having value of the density of feature points which is lower than a threshold value. In this manner, calculation accuracy deterioration by decrease in feature points can be inhibited.

In processing corresponding to the steps S103 and S104 after the step S112, new feature points, which newly emerged in the frame images of the third frame and the second frame previous to the third frame, are extracted and tracked. For example, feature points, which did not emerge in the first frame and newly emerged in the second frame and the third frame, are extracted, and matching relationship therebetween is determined. In processing corresponding to the step S104 after the step S112, the feature points, which were extracted from the region having the decreased density of the feature points described above, are tracked. Next, processing corresponding to the step S105 and the followings steps is repeated.

An example of steps for calculating three-dimensional coordinates of the feature points, which newly emerged in the second frame and the third frame and were extracted and tracked, and the feature points, which were re-extracted, will be explained hereinafter. In this case, the coordinates $O_1$ at the left side in FIG. 6 denotes the position of camera in the second frame, and the coordinates $O_2$ at the right side in FIG. 6 denotes the position of the camera in the third frame. The coordinates $(X_{O1}, Y_{O1}, Z_{O1})$ of the projection center $O_1$ of camera and the tilts $(\omega_1, \phi_1, \kappa_1)$ of camera coordinate axes in the frame image of the second frame have been already calculated in the step S102 and are known. The coordinates $(X_{O2}, Y_{O2}, Z_{O2})$ of the projection center $O_2$ of camera and the tilts (attitude) $(\omega_2, \phi_2, \kappa_2)$ of camera coordinate axes in the frame image of the third frame have been already calculated in the step S107 and are known. In addition, internal orientation parameters (focal point distance, principal point position, and lens distortion coefficient) are also known values. Image coordinates $p_1$ in the frame image of the second frame and image coordinates $p_2$ in the frame image of the third frame are obtained from the respective frame images. Therefore, three-dimensional coordinates P of the feature points which newly emerged in the second frame and the third frame and were extracted and tracked and the feature points which were re-extracted can be calculated. This is true of the third processing cycle and the following processing cycles.

That is, in steps for calculating three-dimensional coordinates of the feature points in the fourth frame and the following frames, the coordinates $O_1$ at the left side in FIG. 6 denotes the position of camera in the (n−2)th frame, and the coordinates $O_2$ at the right side in FIG. 6 denotes the position of the camera in the (n−1)th frame. The coordinates $(X_{O1}, Y_{O1}, Z_{O1})$ of the projection center $O_1$ of camera and the tilts $(\omega_1, \phi_1,$ $\kappa_1)$ of camera coordinate axes in the frame image of the (n−2)th frame are known. The coordinates $(X_{O2}, Y_{O2}, Z_{O2})$ of the projection center $O_2$ of camera and the tilts (attitude) $(\omega_2, \phi_2, \kappa_2)$ of camera coordinate axes in the frame image of the (n−1)th frame are known. In addition, internal orientation parameters (focal point distance, principal point position, and lens distortion coefficient) are also known values. Image coordinates $p_1$ in the frame image of the (n−2)th frame and image coordinates $p_2$ in the frame image of the (n−1)th frame can be obtained from the respective frame images. Therefore, three-dimensional coordinates P of the feature points in the (n−2)th frame and the (n−1)th frame can be calculated.

In processing corresponding to the step S107 in the second cycle after the step S112, exterior orientation parameters (position and direction) of the camera 400 in the fourth frame are calculated by using a backward intersection method. As the backward intersection method, a single photo orientation, a DLT method, or relative orientation may be used. An example will be explained hereinafter in which exterior orientation parameters (position and direction) of the camera 400 in the fourth frame are calculated by using relative orientation.

In this case, exterior orientation parameters (position and direction) of the camera 400 in the fourth frame are calculated by using relative orientation shown in the formulas 8 to 11 and FIG. 8. In the relative orientation, exterior orientation parameters are calculated by using at least six corresponding points in right and left images. In this case, for example, the left image is the frame image of the third frame, and the right image is the frame image of the fourth frame. The exterior orientation parameters in the third frame are known, and the three-dimensional coordinates of plural feature points are known. Image coordinates of feature points in two frame images can be obtained from the respective frame images. Thus, exterior orientation parameters (position and direction of the camera 400), which are unknown, in the fourth frame can be calculated. This is true of the third processing cycle and the following processing cycles (for example, cases of calculation of exterior orientation parameters of the camera 400 in a fifth frame and a sixth frame).

For example, when calculation of exterior orientation parameters (position and direction) of the camera 400 in the fourth frame and the following frames are performed by the relative orientation shown in FIG. 8, for example, the left image is the frame image of the (n−1)th frame, and the right image is the frame image of the (n)th frame. The exterior orientation parameters in the (n−1)th frame are known, the three-dimensional coordinates of plural feature points are known. Image coordinates of feature points in two frame images can be obtained from the respective frame images. Thus, exterior orientation parameters (position and direction of the camera 400), which are unknown, in the (n)th frame can be calculated.

In processing for calculating the back-projected points in the (n)th frame (fourth frame or the following frame), each of the three-dimensional coordinates of the plural feature points of the object to be measured in the real space and the position of the camera 400 in the (n)th frame is connected by a line. These three-dimensional coordinates of the plural feature points are calculated based on the frame images of the (n−2)th frame, the (n−1)th frame, and the previous frames. An intersection point of the line and a surface of the frame image (actual image) of the (n)th frame is determined as a back-projected point of each feature point in the real space.

In the processing system 2, processing once stops in the step S110a, and processing in the step S112a and the following steps starts. In the step S112a and the following steps, the frame to be processed goes to next one frame, and processing in the step S102a and the following steps is repeated.

In processing corresponding to the step S107a in the second cycle and the following cycles in the processing system 2, a single photo orientation, a DLT method, or relative orientation may be used. In the single photo orientation, values obtained by the direction measuring device 300 are substituted for the direction ($\omega, \phi, \kappa$) in the formula 4, and the position of the camera 400 in the (n)th frame is calculated. In the DLT method, since the variables $L_1$ to $L_{11}$ include the exterior orientation parameters of the direction ($\omega, \phi, \kappa$), the variables $L_1$ to $L_{11}$ are calculated based on values obtained by the direction measuring device 300, and the position of the camera 400 in the (n)th frame is calculated. In the relative orientation, values (the directions in photographing of the (n−1)th frame and in photographing of the (n)th frame) from the direction measuring device 300 are substituted for the parameters ($\kappa_1, \phi_1$) and ($\kappa_2, \phi^2, \omega_2$) in the formula 9, and the position of the camera 400 in the (n)th frame is calculated. This is true of the third processing cycle and the following processing cycles (for example, processing corresponding to the step S107a in the fifth frame and the sixth frame). The other notes of each processing in the step S112a and the following steps are the same as those in the above processing system 1.

As described above, in this embodiment, the three-dimensional coordinates of the feature points of the object to be measured are back-projected to the frame image photographed from the specific position, and the image coordinates of the back-projected feature points and the feature points in this frame image are compared. In this case, the feature points, which are mismatched (that is, of which positions are mismatched), are removed as feature points which are mistracked between the plural frames. In this case, the two processing systems, of which the calculation conditions for obtaining the coordinates of the back-projected points (back-projected coordinates) are different from each other, are performed, and the detection of the above mistracked points is performed on each of back-projected coordinates obtained on the two processing systems. The mistracked points detected in at least one of the processing systems are removed, and are not succeeded to the following processing.

Advantages

In the above method, different mistracked points are detected in the processing by the two processing systems due to difference in output source of the exterior orientation parameters, and failure to detect mistracked points can be inhibited. Thus, accuracy deterioration of position detection of the camera 400, which may be caused by succession of the mistracked points between the frames, can be inhibited.

That is, in the processing shown in FIG. 3, the exterior orientation parameters of the first frame and the second frame are provided from different processing systems 1 and 2, and the following calculations 1 to 3 are performed based on the calculation conditions of the different systems. In the calculation 1, the three-dimensional coordinates of the feature points of the object to be measured are calculated in the respective processing systems. In the calculation 2, the camera position in the third frame is calculated based on the calculated three-dimensional coordinates of the feature points. In the calculation 3, the back-projected coordinates are calculated by using the calculated camera position in the third frame. In this case, due to difference in calculation conditions in the steps S107 and S107a, a tendency in which the detection results of the irregular points (mistracked points) in the steps S110 and S110a are different, is generated. That is, a tendency in which the irregular points (mis-tracked points) are not detected in the processing system 1 and are detected in the processing system 2 and a tendency in which the irregular points (mistracked points) are not detected in the processing system 2 and are detected in the processing system 1 are generated. Thus, failure to detect mistracked points can be inhibited.

In this processing, the specific position (the camera position in the third frame), which is not used in the calculation of back-projected coordinates in the processing system 2 and is used in the calculation of back-projected coordinates in the processing system 1, is output as a position of the camera 400 from the moving image processing device 100 to an external section. That is, the processing by the processing system 2 for detection of mistracked points is completed every one cycle, and the data is not succeeded to the following cycles. Thus, in the processing system 2, increase in errors, which may be caused by sequential succession of data, does not occur. That is, even when errors are generated in the processing system 2 due to any factors, in the next cycle, new initial data is obtained, and error factors of the processing, which generated the above errors, are not used. Thus, the problem in which errors are gradually accumulated in the processing system 2, may not occur.

2. Second Embodiment

In this embodiment, the calculation of the position of the camera 400 in the third frame, which is required for the calculation of three-dimensional coordinates in the processing system 2, is performed by a method different from that of the processing system 1. Specifically, the calculation of the position of the camera 400 in the third frame, which is performed in the step 107a of the processing system 2, is performed based on the position and the speed of the camera 400 therebefore. The method in this embodiment can be used for the case in which the position relationship between the camera and the object (for example, the street) to be measured is known.

Figure 10:
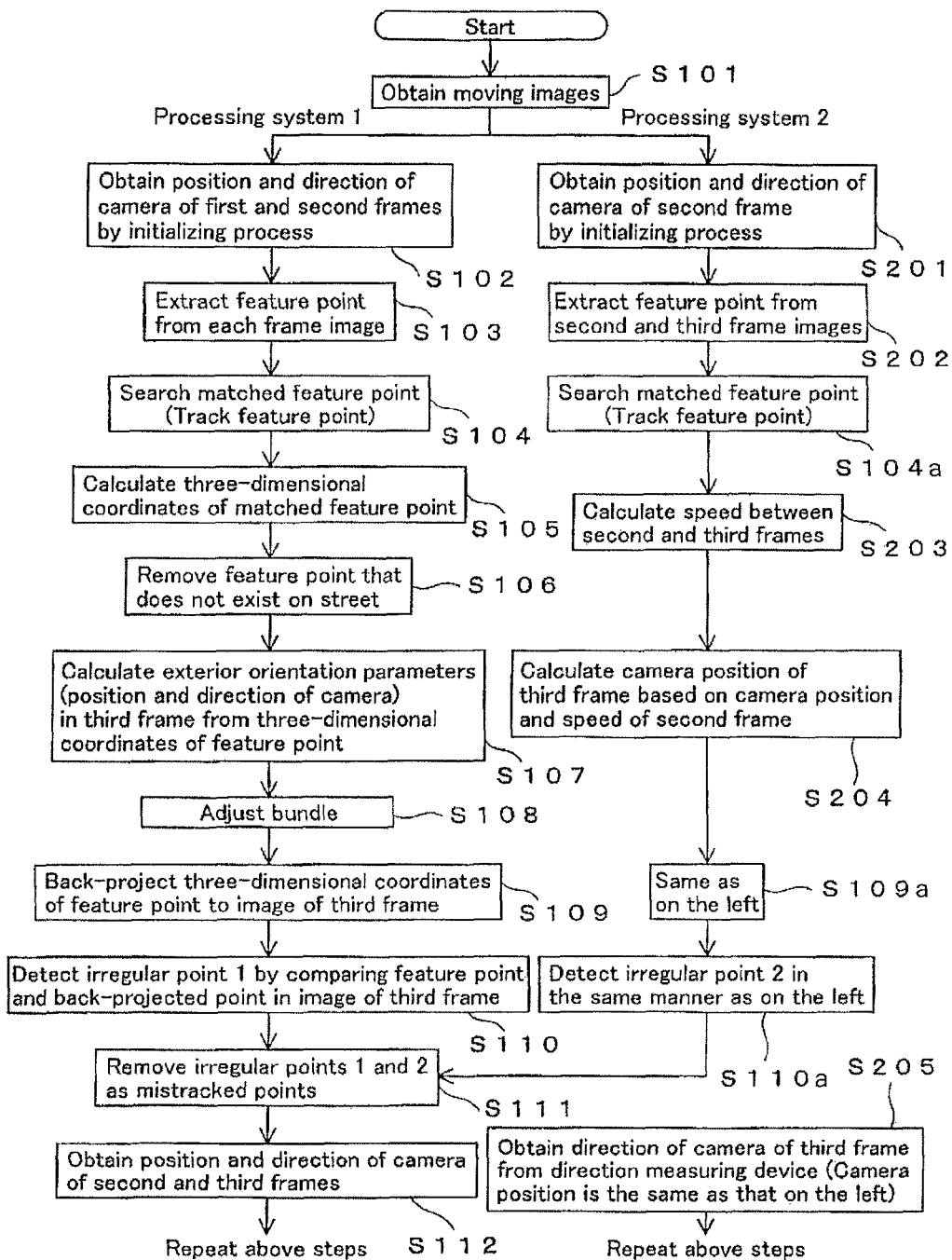
FIG. 10 is a flow chart showing one example of steps of another processing of an embodiment.

In this case, a camera speed calculating unit 112 and a camera position calculating unit 113 (camera position calculating unit using a camera speed) are added to the block diagram shown in FIG. 2. The camera speed calculating unit 112 calculates a moving speed of the camera 400. The camera position calculating unit 113 calculates a position of the camera 400 from the speed of the camera 400. FIG. 10 shows one example of steps of processing. In FIG. 10, the substances of processing at the portions of the same reference symbols as in FIG. 3 are the same as in the case shown in FIG. 3. This is true of the third embodiment and the following embodiments.

In this processing by the processing system 2, the following processing is performed. First, after the step S101, the position and the direction of the camera 400 in the second frame are obtained by the same processing as in the step S102 (in step S201). The data of the position of the camera 400 in the second frame in the step S201 may be obtained from the direction measuring device 300. After the step S201, feature points of the object to be measured are extracted from a frame image (second frame image) of a second frame and a frame image (third frame image) of a third frame (in step S202). Next, feature points matched between the two frame images are searched (tracked) (in step S104a).

After that, the speed of the camera 400 (moving object 10) between photographing of the second frame and the third frame is calculated (in step S203). Specifically, first, image coordinates of the feature points are converted to space coordinates ($X_2, Y_2$) and ($X_3, Y_3$) by using the position and the direction of the camera 400 and the distance from the street 500. Next, the speed V is calculated by using the following formula 14.

$$V = \frac{\text{Movement amount}}{\text{Time interval between frames}} \quad \text{Formula 14}$$

$$= \frac{\sqrt{(X_3 - X_2)^2 + (Y_3 - Y_2)^2}}{t_3 - t_2}$$

Next, the position of the camera 400 in the third frame is calculated based on the position of the camera 400 in the second frame and the speed V between the second frame and the third frame (in step S204). After that, the same steps (steps S109a and S110a) as in the first embodiment are performed. In this case, the three-dimensional coordinates of the feature points calculated in the step S105 are used as those used in the steps S109a and S110a. In processing corresponding to the step 5105 in the fourth frame and the following frames, a speed between (n−1)th frame and (n)th frame is calculated in the same manner as in the above case, and the same calculation as in the above case is performed. In first processing (step S205) in the second cycle and the following cycles in the processing system 2, the data of the direction of the camera 400 in the (n)th frame is obtained from the direction measuring device 300, and the value calculated in the processing system 1 (in the case of FIG. 10, the value calculated in the step S107) is used as the data of the position of the camera 400 in the (n)th frame.

In this embodiment, the calculation method itself for obtaining irregular points 2 in the step S110a in the processing system 2 is different from that in the processing system 1, so that it is more highly probable that irregular points, which are different between the processing systems 1 and 2, can be detected, for the same reason as in the case of the first embodiment. Thus, failure to detect mistracked points can be inhibited in comparison with the case of performing using only the processing system 1.

In the step S201 shown in FIG. 10, the data of the position of the camera 400 may be obtained from a system (for example, the GPS receiver 200) which is different from the step S102. In the step S201, the data of the direction of the camera 400 may be obtained from the direction measuring device 300, and the data of the position of the camera 400 may be obtained from the GPS receiver 200.

In the step S205, the values calculated in the processing system 1 (in the case shown in FIG. 10, the exterior orientation parameters calculated in the step S107) may be used as the data of the direction and the position of the camera 400. In this case, although the same exterior orientation parameters for calculation are used in the processing systems 1 and 2, the calculation methods before the step S110 and before the step S110a are different from each other, so that it is more highly probable that irregular points, which are different between the processing systems 1 and 2, can be detected.

3. Third Embodiment

In this embodiment, the calculation of the position of the camera 400 in the third frame, which is required for the calculation of back-projected coordinates in the processing system 2, is performed by a method different from that of the processing system 1. Specifically, the calculation of the position of the camera 400 in the third frame, which is performed in the step S107a of the processing system 2, is performed based on the displacement condition of the camera 400 therebefore.

Figure 11:
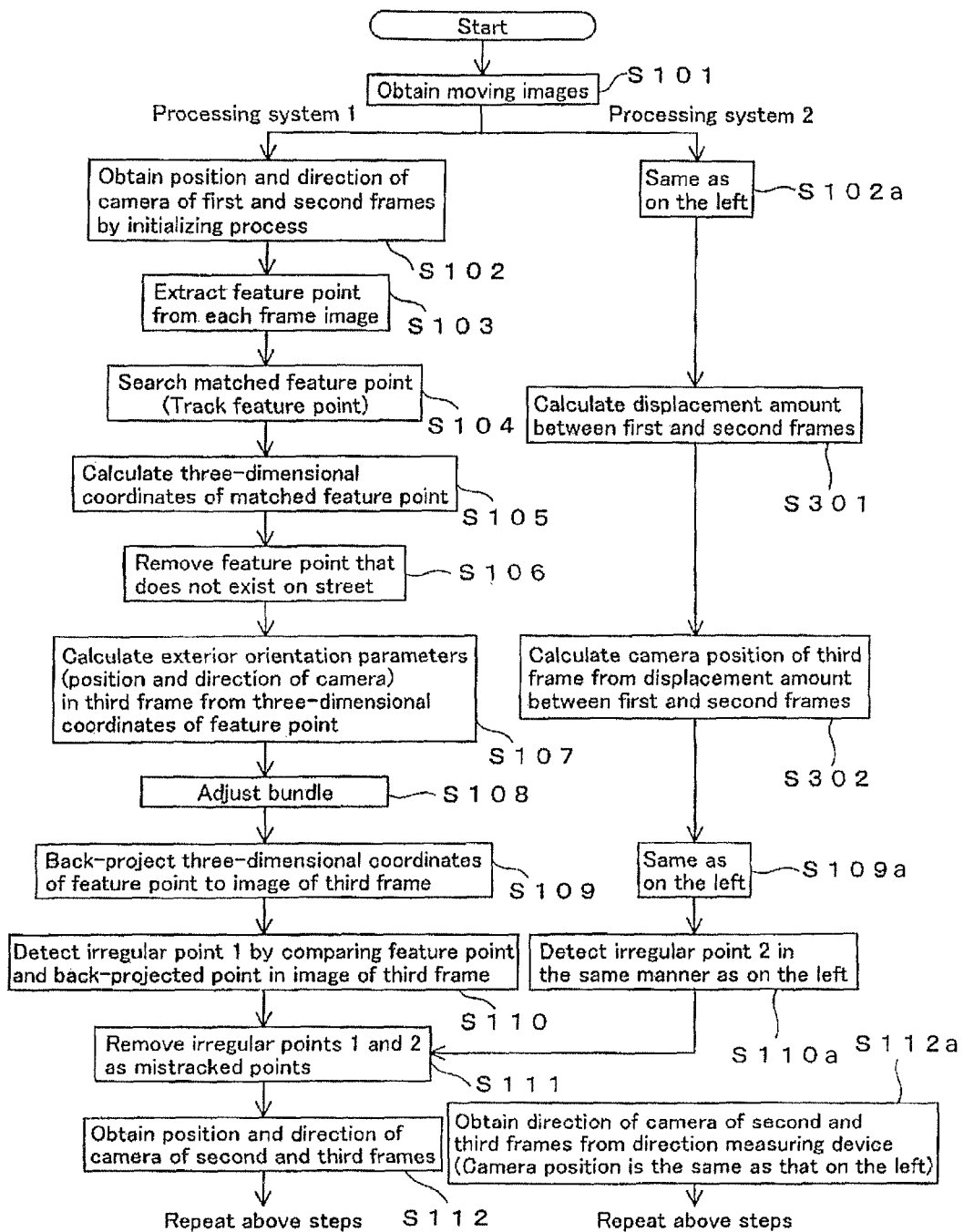
FIG. 11 is a flow chart showing one example of steps of another processing of an embodiment.

In this case, an inter-frame displacement amount calculating unit 114 and a camera position calculating unit 115 (camera position calculating unit using displacement amount) are added to the block diagram shown in FIG. 2. The inter-frame displacement amount calculating unit 114 calculates displacement amount between frames. The camera position calculating unit 115 calculates a position of the camera 400 in a next frame by using the displacement amount calculated by the inter-frame displacement amount calculating unit 114. FIG. 11 shows one example of steps of processing in this embodiment. In this processing, after the step S102a in the processing system 2, displacement amount of the camera 400 (moving object 10) between a first frame and a second frame is calculated based on the position and the direction of the camera 400 obtained in the step S102a (in step S301).

Next, it is estimated that the camera 400 continuously moves by the displacement amount calculated in the step S301 while the camera 400 maintains the direction in the second frame obtained in the step S102a, and the position of the camera 400 in the third frame is calculated (in step S302). After that, the same steps (steps S109a and S110a) as in the first embodiment are performed. In this case, the three-dimensional coordinates of the feature points calculated in the step S105 are used as those used in the steps S109a and S110a.

The calculation of displacement amount can also be performed based on GPS information from the GPS receiver 200 and values measured by the direction measuring device 300. The calculation of displacement amount can also be performed based on combination of image analysis, GPS information, and values measured by the direction measuring device 300. The calculation of displacement amount of the camera 400 in the (n)th frame (the fourth frame or the following frame) is performed based on camera positions in the (n−2)th frame and the (n−1)th frame. The initial values of the position and the direction of the camera in the step S102a may be obtained from the GPS receiver 200 and the direction measuring device 300.

4. Fourth Embodiment

Figure 12:
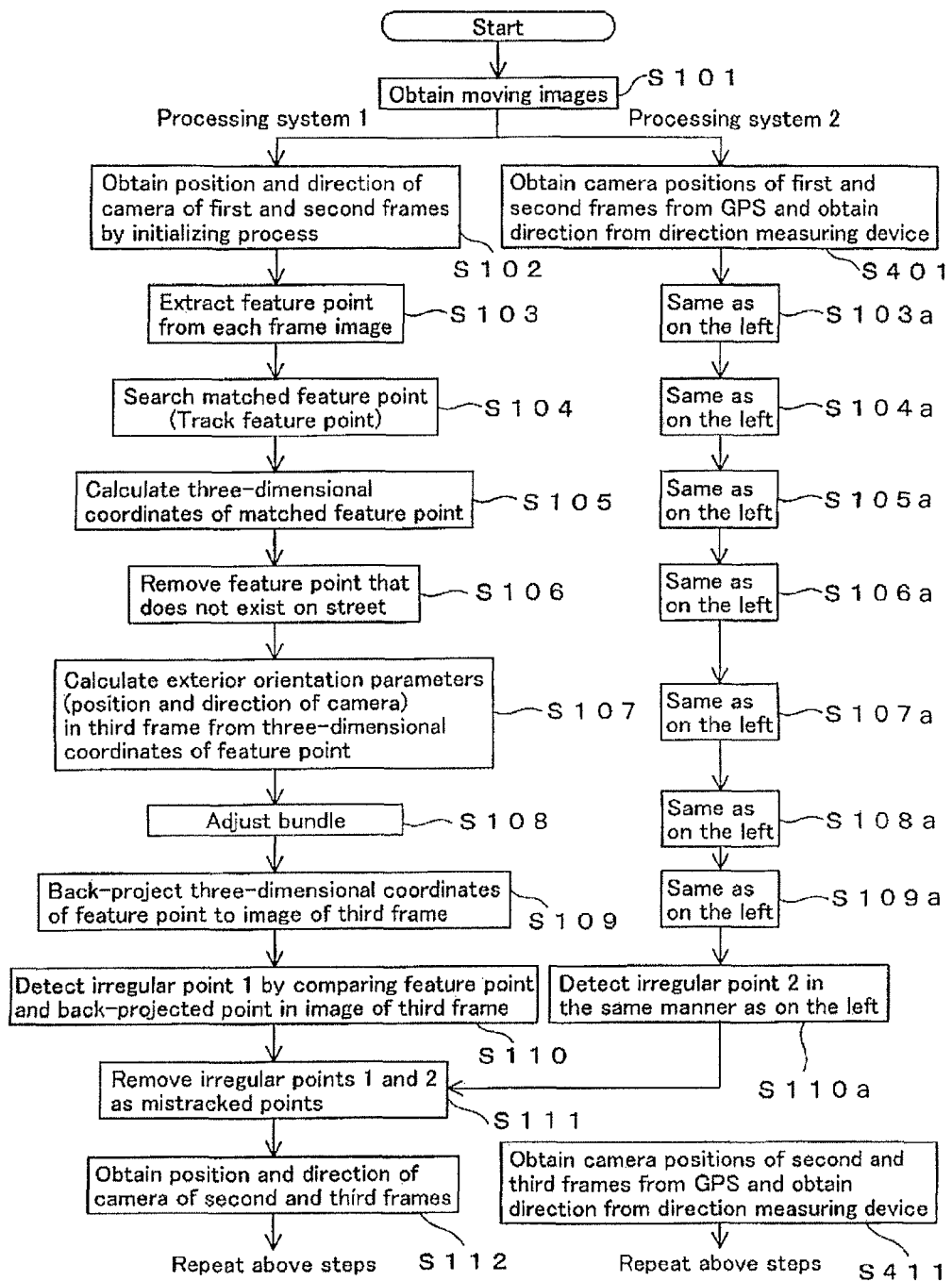
FIG. 12 is a flow chart showing one example of steps of another processing of an embodiment.

In this example, as initial values in the processing system 2, the position of the camera 400 is obtained from a UPS, and the direction of the camera 400 is obtained from the direction measuring device 300. FIG. 12 shows one example of steps of processing in this embodiment. In this processing, in a first step (step S401) of the processing system 2, the positions of the camera 400 in the first frame and the second frame are obtained from the GPS receiver 200, and the directions of the camera 400 in the first frame and the second frame are obtained from the direction measuring device 300 (in step S401). In processing corresponding to the step S112a in the second cycle and the following cycles, the positions of the camera 400 in (n−2)th frame and (n−1)th frame are obtained from the GPS receiver 200, and the directions of the camera 400 in the (n−2)th frame and the (n−1)th frame are obtained from the direction measuring device 300. Another processing is the same as the case shown in FIG. 3.

5. Fifth Embodiment

Figure 13:
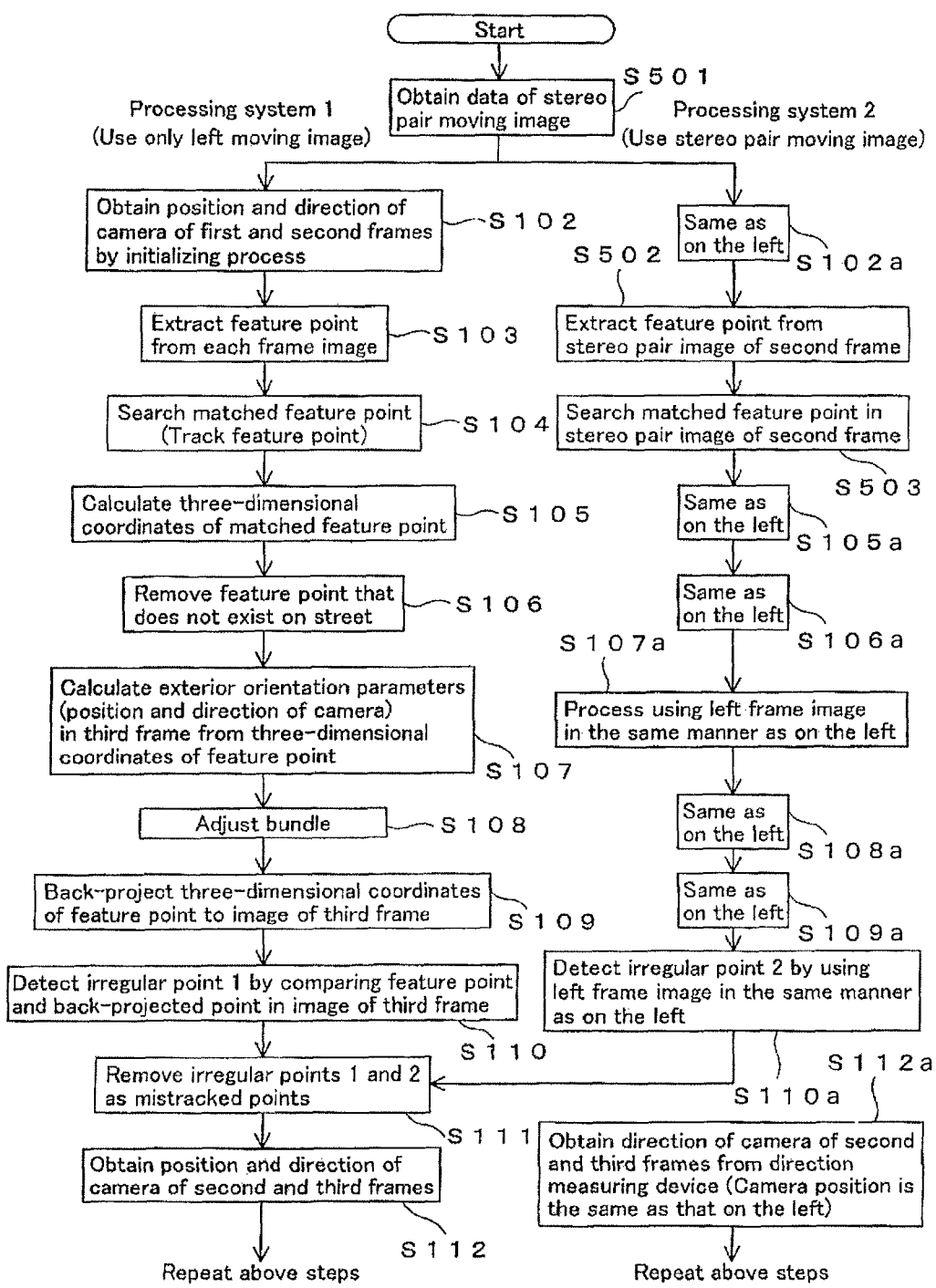
FIG. 13 is a flow chart showing one example of steps of another processing of an embodiment.

In this example, a stereo camera photographing two moving images from different viewpoints is used. FIG. 13 shows one example of steps of processing. In this example, the structure shown in FIG. 2 performs functions shown in FIG. 2 and relevant description, and also performs processing on stereo pair images. Relationship of relative positions and relative directions of a right camera and a left camera of the stereo camera of the stereo camera are known as set values.

In this example, first, data of stereo pair moving images is obtained from the camera 400 (in step S501). The stereo pair moving images are composed of moving images from a camera for obtaining right images and moving images from a camera for obtaining left images. The left moving images and the right moving images are composed of plural frame images which are sequentially photographed in a time-series.

After the step S501, in the processing system 1, the right moving images are not used, and the following processing is performed on only the left moving images. The processing in the processing system 1 is the same as in the case of the first embodiment. In the processing system 1, the processing can be performed by using one of the stereo pair images. The processing can also be performed by using the right moving images without the left moving images.

In the processing system 2, first, the step S102a is performed in the same manner as in the first embodiment, and feature points arc extracted from each of a left stereo pair image and a right stereo pair image in a second frame of the stereo pair moving images obtained in the step S501 (in step S502). Next, matching relationship of the feature points, which are extracted from each of the left stereo pair image and the right stereo pair image in the second frame, are determined (in step S503).

In this case, the position relationship and the direction relationship of the right camera and the left camera of the stereo camera are known, so that in the step S105a, three-dimensional coordinates of the feature points searched in the step S503 are calculated by using the principle shown in FIG. 6. After that, the step S106a and the following steps, which are the same as in the first embodiment, are performed.

In the steps S107a and S110a, the processing is performed by using left frame images photographed by the left camera. In this case, in the step S107a, exterior orientation parameters of the left camera are calculated, and the projection in the step S110a is performed toward the position of the left camera. When the images from the right camera are used in the processing system 1, the steps S107a and S110a in the processing system 2 are performed by using the right camera.

In the processing shown in FIG. 13, the processing using stereo pair images may be performed in the processing system 1. In this case, feature points of the object to be measured are extracted from a stereo pair frame image of a second frame (in step corresponding to the step S103). Next, matching relationship between the feature points, which are obtained from the left and the right stereo pair frame images, is calculated (in step corresponding to the step S104). The three-dimensional coordinates of the feature points, of which the matching relationship between the stereo pair images is obtained, are calculated by using the principle shown in FIG. 6 (in step corresponding to the step S105). The following processing is the same as in the case shown in FIG. 13.

In the processing shown in FIG. 13, the processing using the stereo pair images may be performed in the processing system 1, and the processing using single images, which are continuously photographed, may be performed in the processing system 2. That is, the processing shown in FIG. 13 may be performed in a manner in which types of moving images used in the processing systems 1 and 2 are exchanged. In this case, it is more highly possible that detection of mistracked points, which are detected in the one processing system and not detected in the other processing system, is performed due to using of the different methods, and failure to detect mistracked points can be inhibited. The initial values of the position and the direction of the camera in the step S102a may be obtained from the GPS receiver 200 and the direction measuring device 300.

6. Sixth Embodiment

Figure 14:
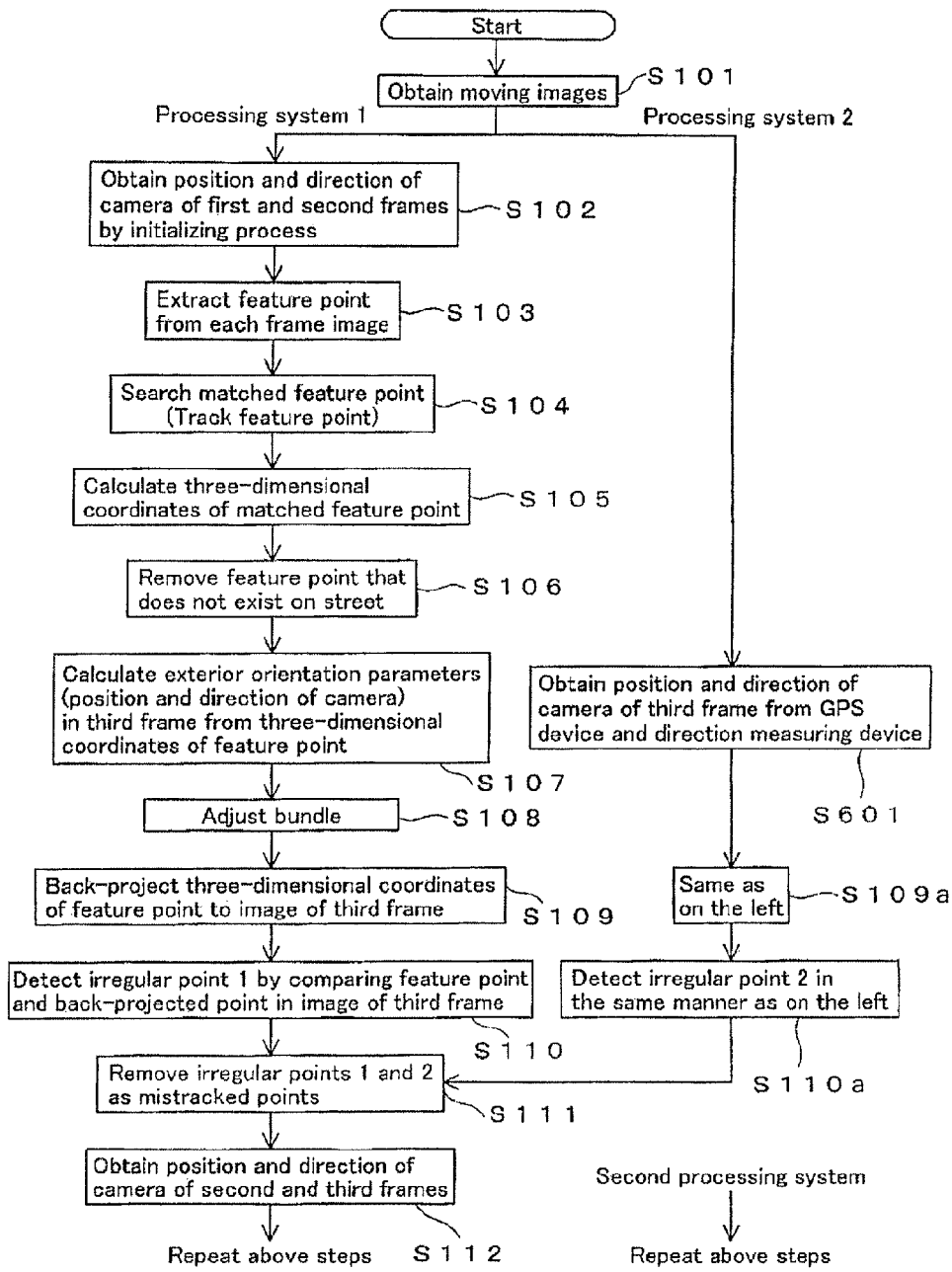
FIG. 14 is a flow chart showing one example of steps of another processing of an embodiment.

In this embodiment, the data of the position and the direction of the camera in the third frame in the processing system 2 are not obtained by calculation using feature points, and are directly obtained from the GPS receiver 200 and the direction measuring device 300. FIG. 14 shows one example of steps of processing in this feature. In this processing, in the processing system 2, step S 601 is executed, and the position and the direction of the camera 400 in the third frame are obtained from the GPS receiver 200 and the direction measuring device 300 in a manner separate from the processing system 1. Three-dimensional coordinates of the feature points of the object to be measured, which were calculated in the step S105, are used as those of the feature points of the object to be measured, which are used in the step S109a.

7. Seventh Embodiment

A laser scanner may be used as a device for obtaining three-dimensional coordinates of the feature points of the object to be measured in the processing system 2 shown in FIG. 3. The laser scanner irradiates a laser beam onto an object to be measured, and receives reflection light thereof, thereby obtaining information of a distance, a direction, and an elevation angle (or a depression angle) from a mounted position of the laser scanner (viewpoint) to a measurement point, and calculates information of three-dimensional coordinates of the object to be measured. The laser scanner obtains information of intensity, color, color phase, saturation of the reflection light from the measurement point. The laser scanner calculates point cloud position data, which includes three-dimensional coordinate values, based on the above information.

When three-dimensional coordinates of the object to be measured are obtained by the laser scanner in the processing system 2 shown in FIG. 3, the calculation of the camera position uses three-dimensional coordinates of the object to be measured, which are obtained from the laser scanner, and the calculation of the back-projected coordinates uses the feature points of the object to be measured, which are obtained from images photographed by the camera. In this case, too, since the back-projected coordinates are calculated by using parameters obtained from the different systems, a tendency in which the detection results of the mistracked points of the feature points in the processing systems are different is generated.

Another Example

In the processing shown in FIG. 3, the data of the direction of the camera 400 may be obtained from the same output source, and the data of the position of the camera 400 may be obtained from different output sources. The initial values of the direction of the camera in the steps S102 and S102a shown in FIG. 3 may be obtained from the direction measuring device 300. In the embodiments, the object to be measured is the street 500, and is not limited to the street 500. Alternatively, any ones, which can be photographed from the moving object, of which feature points can be extracted, and of which three-dimensional coordinates of feature points can be can calculated, may be used as the object to be measured. For example, landscape or the like, which can be seen from the moving object, can be used as another example of the object to be measured.

In the embodiments, the measurement of position of the camera (position of the moving object) is the main subject, so that it is not necessary that three-dimensional position data of previous objects to be measured, which are out of range to be calculated, be stored. However, the structure of the embodiments can also be used for a device obtaining three-dimensional point cloud position data of the object photographed in frame images of the moving images. In this case, accuracy deterioration of exterior orientation parameters, which may be gradually generated in photographing moving images, can be inhibited, and accuracy deterioration of obtained three-dimensional coordinates of the object to be measured (for example, landscape or the like) can be inhibited. Plural embodiments explained as examples in the specification can be combined and performed.

In the embodiments, the case is explained in which the processing flows of the processing system 1 used as a primary system and the processing system 2 used for detection of mistracked points are used. Alternatively, the number of the systems for detection of mistracked points may be increased. For example, in addition to the processing systems 1 and 2 shown in FIG. 3, at least one of the processing systems 2 shown in FIGS. 10 to 14 may be performed, and the number of processing for detection of mistracked points may be increased. In this case, all of the feature points detected as mistracked points in the flow of each processing may be removed, and the results obtained thereby are succeeded to the primary processing by the processing system 1.

The position measurement using a GPS can have a high accuracy in an ideal condition. However, position information cannot always be obtained with high accuracy due to various factors (environment and weather). In this case, when the accuracy of GPS is low, position measurement is performed by using one of the embodiments explained in the specification of the application, and the device for obtaining the position data is changed to the GPS at the time of obtaining the GPS information with high accuracy. When GPS information cannot be obtained or accuracy of the GPS information is deteriorated, the use of the GPS is stopped, and the position measurement starts which uses one of the embodiments which can reliable position data obtained from the GPS as an initial value. In this manner, the position of the moving object can be obtained with high accuracy in a real time by using the GPS and the position measurement of the above embodiment for each other as complementary devices.

Position information obtained from information of optical beacons or radio beacons, which are provided along the road and on the street, can be used for searching the position of the camera 400 (position of the vehicle 10) based on information provided from external sections. In this case, the GPS may be not used or may be used.

In the embodiments, although the vehicle running on the street is used as one example of the object to be measured, the place at the vehicle is moved is not limited to the street. For example, the present invention can be used for vehicles for construction and vehicles which do not run on places other than streets. The moving object is not limited to a vehicle, and may be a boat, a ship, an airplane, or a movable robot.

The present invention can be used for processing of moving images.

What is claimed is:

1. A moving image processing device comprising:
   a moving image obtaining unit that obtains a moving image of an object to be measured, which is continuously photographed by a camera moving relative to the object;
   a feature point extracting unit that extracts plural feature points from each of a first frame image, a second frame image, and a third frame image included in the moving image;
   a feature point tracking unit that tracks a matching relationship of the plural feature points extracted from the first frame image, the second frame image, and the third frame image;
   a real space coordinates calculating unit that calculates real space coordinates of the plural feature points of which the matching relationship is determined based on a first exterior orientation parameter of the camera when the camera photographed the first frame image and a second exterior orientation parameter of the camera when the camera photographed the second frame image;
   an exterior orientation parameter calculating unit that performs a first processing in which a third exterior orientation parameter of the camera when the camera photographed the third frame image is calculated based on the real space coordinates of the plural feature points of which the matching relationship is determined and a second processing in which the third exterior orientation parameter of the camera when the camera photographed the third frame image is calculated, wherein the second processing is different from and independent of the first processing;
   a back projected coordinates calculating unit that calculates a first back-projected coordinate obtained by connecting with a straight line the real space coordinates of the plural feature points and a position of the camera when the camera photographed the third frame image, which was obtained by the first processing, thereby back-projecting the plural feature points to the third frame image and for calculating a second back-projected coordinate obtained by connecting with a straight line the real space coordinates of the plural feature points and the position of the camera when the camera photographed the third frame image, which was obtained by the second processing, thereby back-projecting the plural feature points to the third frame image; and
   a mistracked point detecting unit which compares the first and second back-projected coordinates and feature points from the plural feature points that were extracted from the third frame image, and determines a feature point extracted from the third frame image as a mistracked point which is mistracked by the feature point tracking unit when the result of the comparison is larger than a predetermined threshold value.

2. The moving image processing device according to claim 1, wherein the moving image processing device outputs the position information of the camera when the camera photographed the third frame image; and
   wherein the moving image processing device uses the position information of the camera when the camera photographed the third frame image obtained in the first processing as the position information of the camera and the position information of the camera when the camera photographed the third frame obtained in the second processing is not used as the position information of the camera.

3. A moving image processing device comprising:
   a moving image obtaining unit that obtains a moving image of an object to be measured, which is continuously photographed by a camera moving relatively to the object;
   a feature point extracting unit that extracts plural feature points from each of a first frame image, a second frame image, and a third frame image included in the moving image;
   a feature point tracking unit that tracks a matching relationship of the plural feature points in the first frame image, the second frame image, and the third frame image;
   a real space coordinates calculating unit that calculates real space coordinates of the plural feature points from which the matching relationship is determined based on an exterior orientation parameter of the camera when the camera photographed the first frame image and an exterior orientation parameter of the camera when the camera photographed the second frame image;

an exterior orientation parameter calculating unit that performs a first processing in which an exterior orientation parameter of the camera when the camera photographed the third frame image is calculated based on the real space coordinates of the plural feature points from which the matching relationship is determined, and a second processing in which a position of the camera when the camera photographed the third frame image is calculated based on a direction of the camera which photographed the third frame image, which was measured by a direction measuring unit, and the real space coordinates of the plural feature points from which the matching relationship is determined;

a back projected coordinates calculating unit that calculates a first back-projected coordinate obtained by connecting with a straight line the real space coordinates of the plural feature points and the position of the camera when the camera photographed the third frame image, which was obtained by the first processing, thereby back-projecting the plural feature points to the third frame image and for calculating a second back-projected coordinate obtained by connecting with a straight line the real space coordinates of the plural feature points and a position of the camera when the camera photographed the third frame image, which was obtained by the second processing, thereby back-projecting the plural feature points to the third frame image; and a mistracked point detecting unit that compares the first and second back-projected coordinates and feature points from the plural feature points that were extracted from the third frame image, and determines a feature point extracted from the third frame image as a mistracked point which is mistracked by the feature point tracking unit when the result of the comparison is larger than a predetermined threshold value.

4. A moving image processing device according to claim 3, wherein the moving image processing device outputs a position information of the camera when the camera photographed the third frame image; and wherein the moving image processing device uses the position information of the camera when the camera photographed the third frame image obtained in the first processing as the position information of the camera and the position information of the camera when the camera photographed the third frame obtained in the second processing is not used as the position information of the camera.

* * * * *